(12) United States Patent
Russ

(10) Patent No.: US 9,835,844 B2
(45) Date of Patent: *Dec. 5, 2017

(54) VISUAL TARGET ACQUISITION SCOPE SYSTEM

(71) Applicant: Yoachim C. Russ, Annapolis, MD (US)

(72) Inventor: Yoachim C. Russ, Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/148,893

(22) Filed: May 6, 2016

(65) Prior Publication Data

US 2016/0246047 A1 Aug. 25, 2016

Related U.S. Application Data

(60) Division of application No. 14/155,044, filed on Jan. 14, 2014, now Pat. No. 9,335,536, which is a continuation-in-part of application No. 13/134,918, filed on Jun. 20, 2011, now abandoned.

(60) Provisional application No. 61/752,406, filed on Jan. 14, 2013, provisional application No. 61/397,926, filed on Jun. 18, 2010.

(51) Int. Cl.

| | |
|---|---|
| *G02B 23/00* | (2006.01) |
| *G02B 23/18* | (2006.01) |
| *G02B 23/14* | (2006.01) |
| *F41G 1/38* | (2006.01) |
| *G02B 7/12* | (2006.01) |
| *G02B 27/36* | (2006.01) |
| *F41G 1/30* | (2006.01) |

(52) U.S. Cl.
CPC ............... *G02B 23/18* (2013.01); *F41G 1/38* (2013.01); *G02B 7/12* (2013.01); *G02B 23/14* (2013.01); *G02B 27/36* (2013.01); *F41G 1/30* (2013.01)

(58) Field of Classification Search
CPC ... F41G 1/387; F41G 1/00; F41G 1/38; F41G 1/473; F41G 1/04; F41G 1/35; F41G 1/425; F41G 1/30; F41G 1/40; F41G 1/383; F41G 1/345; F41G 1/08; F41G 1/54; F41G 1/16; F41G 1/28; F41G 1/26; F41G 1/18; F41G 1/17; F41G 1/02; F41G 1/32; F41G 11/001; F41G 11/003; F41G 11/008; G02B 13/00; G02B 23/00; G02B 23/12; G02B 23/14; G02B 23/145; G02B 23/16; G02B 23/18; G02B 23/2446; G02B 7/002; G02B 7/06; G02B 15/00; G02B 27/26

USPC ....... 359/362, 411, 412, 414, 416, 417, 415, 359/419–424, 428–429, 432, 434–435, 359/399–409; 42/111–143, 146; 396/429–431; 348/73, 75

See application file for complete search history.

(56) References Cited

U.S. PATENT DOCUMENTS 9,335,536 B2 * 5/2016 Russ ..................... F41G 1/38

* cited by examiner

*Primary Examiner* — Stephone B Allen
*Assistant Examiner* — Jyotsna Dabbi
(74) *Attorney, Agent, or Firm* — Lawrence G. Fridman, Esq.; Feigin & Fridman, LLC

(57) ABSTRACT

In a visual target acquisition scope system for an adjustable connection is provided between a unity magnification scope producing 1× magnification image viewed by one eye of the user and a photographic lens/viewfinder of a photographic camera viewed by another eye of the user. According to the system, while the user is looking at an object through the unity magnification scope with one eye and looking at the object through the photographic camera lens with the second eye, the target visible with the first eye is also visible with the second eye.

5 Claims, 23 Drawing Sheets

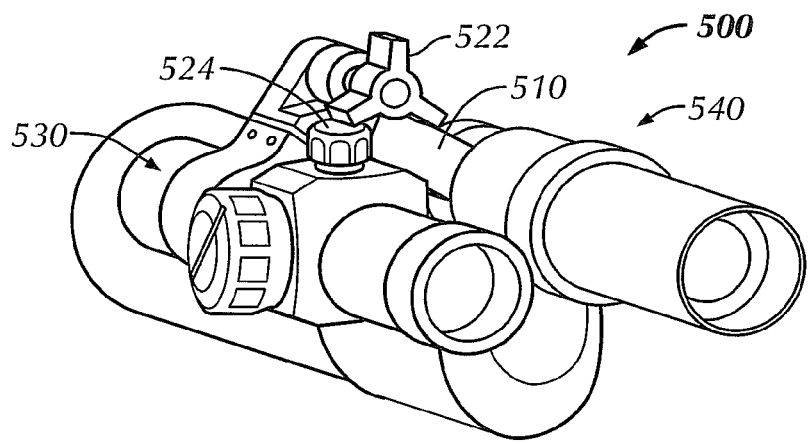
FIG. 19
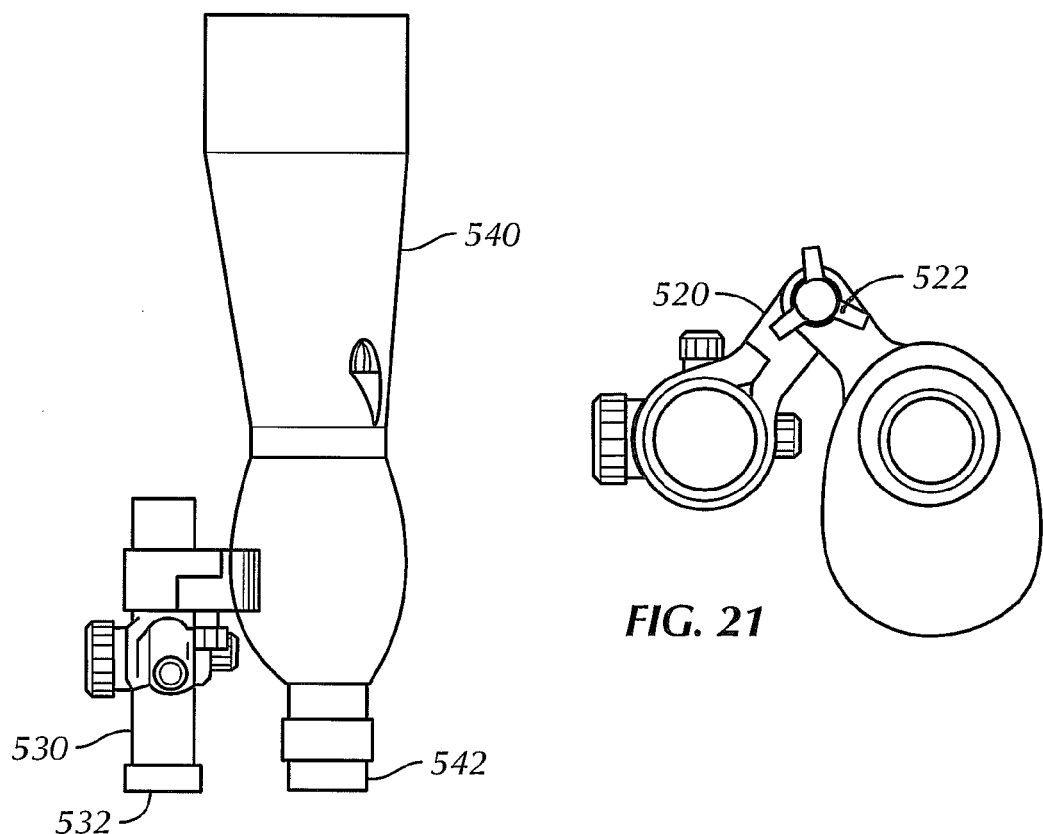
FIG. 20
FIG. 21

VISUAL TARGET ACQUISITION SCOPE SYSTEM

REFERENCE TO RELATED APPLICATION

This Application is a Divisional of currently pending U.S. application Ser. No. 14/155,044 Filed: Jan. 14, 2014, which is a Continuation-In-Part of U.S. application Ser. No. 13/134,918 filed Jun. 20, 2011, which claims priority of Provisional application Ser. No. 61/397,926 filed Jun. 18, 2010. The application also claims priority the Provisional application Ser. No. 61/752,406, filed Jan. 14, 2013. All above applications are incorporated herein by reference in their entirety.

FIELD OF THE INVENTION

The present invention relates to the field of optical devices in general, and more particularly it relates to visual target acquisition systems. The invention also relates to a visual target acquisition system for cameras and other optical devices having high power lenses or scopes.

BACKGROUND OF THE INVENTION

It is known that looking through a high power scope at an object often offers a narrow field of view. In fact, an increase in the power, or magnification, results in a decrease, or further narrowing of the field of view. In the field of optics, the power or magnification is the amount of enlargement one uses over what the naked eye sees naturally. This is typically expressed in numbers followed by an × sign. Zero magnification is expressed as 1×, double the magnification is 2×, and ten times is 10× and so on.

The difficulty of viewing any object through a camera with high power lenses or scopes comes in various forms. One difficulty is in finding the object and viewing it. This process is also known as "target acquisition". Another difficulty is in maintaining a target in the field of view for the duration of the viewing period or as long as needed by a photographer.

Most photographs are taken using regular lenses such as 35 mm to 70 mm, 50 mm being the lens that best copies what our eyes see. To find a visual target in the viewfinder of a camera, using those lenses, does not present a difficulty. Even going up to a 150 min lens, considered the first level of telephoto lenses, might be easy enough for most people.

However, in using lens's focal lengths into the 400 mm, 600 mm, 1200 mm and higher, presents a serious problem in acquiring the visual target. The reason is that going up in focal length therefore magnification, reduced or narrows the field of view. The higher the power, the narrower the field of view or the part the photographer sees in the viewfinder or the window of a photographic camera.

The holographic scopes with zero magnification are gaining in popularity. Such scopes are similar to the red dot scopes in that they also have other marks or shape such a small circle or a small cross in addition to a dot. Many holographic scopes do not use batteries as a power source.

Thus, it has been a need for a definitive, simple, compact, economical and universal visual target acquisition system associated with photographic cameras. There is also a need for a system which facilitates a user in finding a visual target in a viewfinder/window of a camera equipped with a telephoto lens and utilizing holographic scopes with zero magnification.

SUMMARY OF THE INVENTION

The present invention provides a rapid visual target acquisition by means of a system which comprises a red dot or holographic type scope with zero (1×) magnification and a high power scope, such as for example, a scope of a photographic camera. The system of the invention brings together a 1× power scope with a high power scope in a particular novel way. Since a 1× scope provides the widest possible field of view, it allows for the rapid locating of any target with one eye. Combining with the scope of the camera simultaneously provides the other eye with a magnified view of a target which is being photographed.

Once both scopes are combined by the target acquisition arrangement of the invention and the distance between the scopes is set to accommodate the viewer's Interpupillary Distance (IPD), it is a simple matter of placing the red or holographic dot on a target and immediately viewing the target. After a few moments a human brain focuses on viewing through the camera side. If the target moves, the brain shifts some of its focus from the camera side to the red or holographic dot and the target is reacquired immediately and without conscious effort The design and precise execution of the assembly of the invention results in the automatic optical plane alignment of the 1× red dot or holographic scope and the camera scope, thereby reducing the need for multiple adjustments. The red or holographic dot in the 1× scope superimposes a centered point of reference in the field of view. This not only aids in acquiring any target rapidly, it also eliminates the need for constant adjustments as the distance to a target changes.

The system of the invention is capable of adjusting the distance between the scopes to match the unique Interpupillary Distance (IPD) of any user. The viewer uses both eyes simultaneously, in a comfort, to find and view any target.

The present invention provides a rapid visual target acquisition by means of a system which comprises a red dot or holographic type scope with zero (1×) magnification and a photographic camera or a high power optical tube scope. The system of the invention brings together a 1× power scope with a high power scope in a particular novel way in parallel. Since a 1× scope provides the widest possible field of view, it allows for the rapid locating of any target with one eye. The holographic mark or the red dot provides for an artificial point of reference that aids in focusing on the target. Combining that with a photographic camera or a high power scope, simultaneously provides the other eye with a magnified view of that target The idea is that one only needs to adjust the distance between the two sides to match the distance of the viewer's IPD. The way the two sides are bridged assures that the distance from the pivot point is exactly the same to the center of the, zero magnification and high magnification eyepieces.

According to one aspect of the invention a zero magnification having the widest possible field of view, holographic or red dot scope, for a point of reference, is attached to the camera so as to be used in combination with its lens system. There is only the need to adjust the distance from the zero magnification scope to the viewfinder to match the distance between the photographer's eyes. Since the eyes work in parallel, when the photographer keeps both eyes open, places the holographic mark or the red dot on the visual target, it simultaneously appears magnified in the view finder/window and the picture is taken.

The advantages of the system of the invention are even greater for photographers trying to make pictures of moving targets such as life in the wild, birds in the sky or sporting events. Because looking through the holographic or red dot scope, where the field of view is the same as the naked eye, it is easy to find and even follow a moving target. Placing the holographic mark or the red dot on the target viewing it with one eye and keeping it on the target is easy and intuitive. The other eye gets to view the target magnified simultaneously effortlessly.

BRIEF DESCRIPTION OF THE DRAWINGS

Exemplary embodiments of the invention will be now described in greater detail herein below with reference to the accompanying drawings, in which:

FIG. 19 is a perspective view of a system formed by a zero magnification, holographic or red dot scope attached to a large spotting scope;

FIG. 20 is a top view thereof;

FIG. 21' is a rear or end view of thereof;

Figure 1:
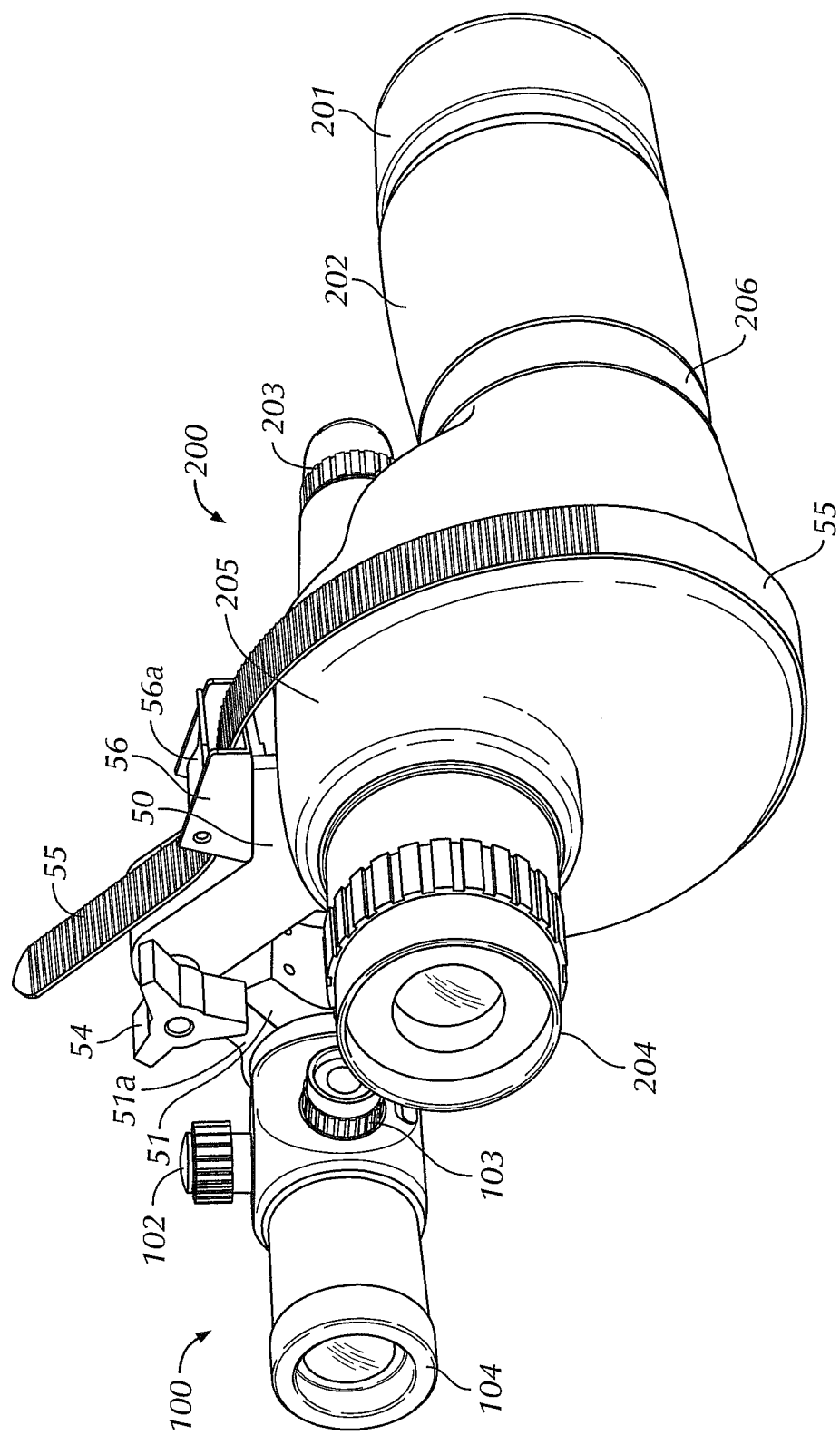
FIG. 1 is a perspective view of the pivot embodiment of the system on the invention showing a spotting scope on a right side and a red dot scope on a left side.

It should be noted that in the drawings and description of the application, right eye dominance is assumed. However, the system of the invention can be easily reconfigured accommodate a person with left eye dominance.

DETAILED DESCRIPTION OF THE INVENTION

FIGS. 1-5, illustrate one embodiment of the system of the invention having a pivot-type visual target acquisition scope arrangement. The arrangement comprises a target acquisition assembly 10 with the universal base 50 and the clamp pivot 51 adjustably combining/connecting a zero magnification scope or a red dot scope 100 to a power scope or a spotting scope 200.

A universal base 50 is associated with a prism housing section 205 of the spotting scope 200. The position of where the base is placed, fore or aft, determined according to configuration of the individual spotting scope and red dot scope. It is essential that both eyepieces 104 and 204 are disposed within the same plane and at an approximate even distance from the viewer's eyes when placed against the scopes in a face on position, not turned sideways.

Figure 4:
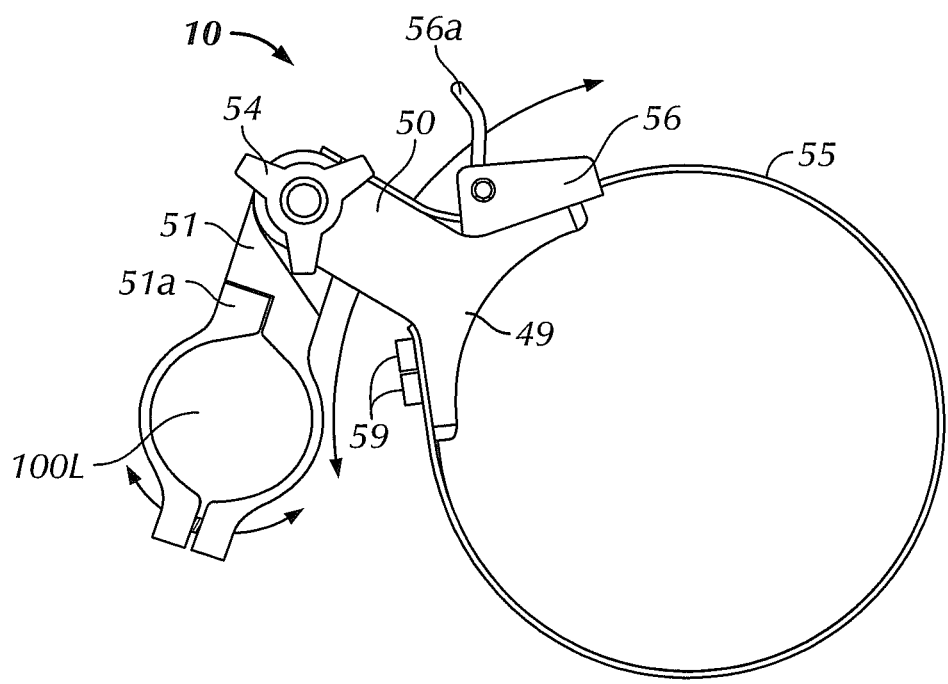
FIG. 4 is a rear elevational view thereof.
Figure 5:
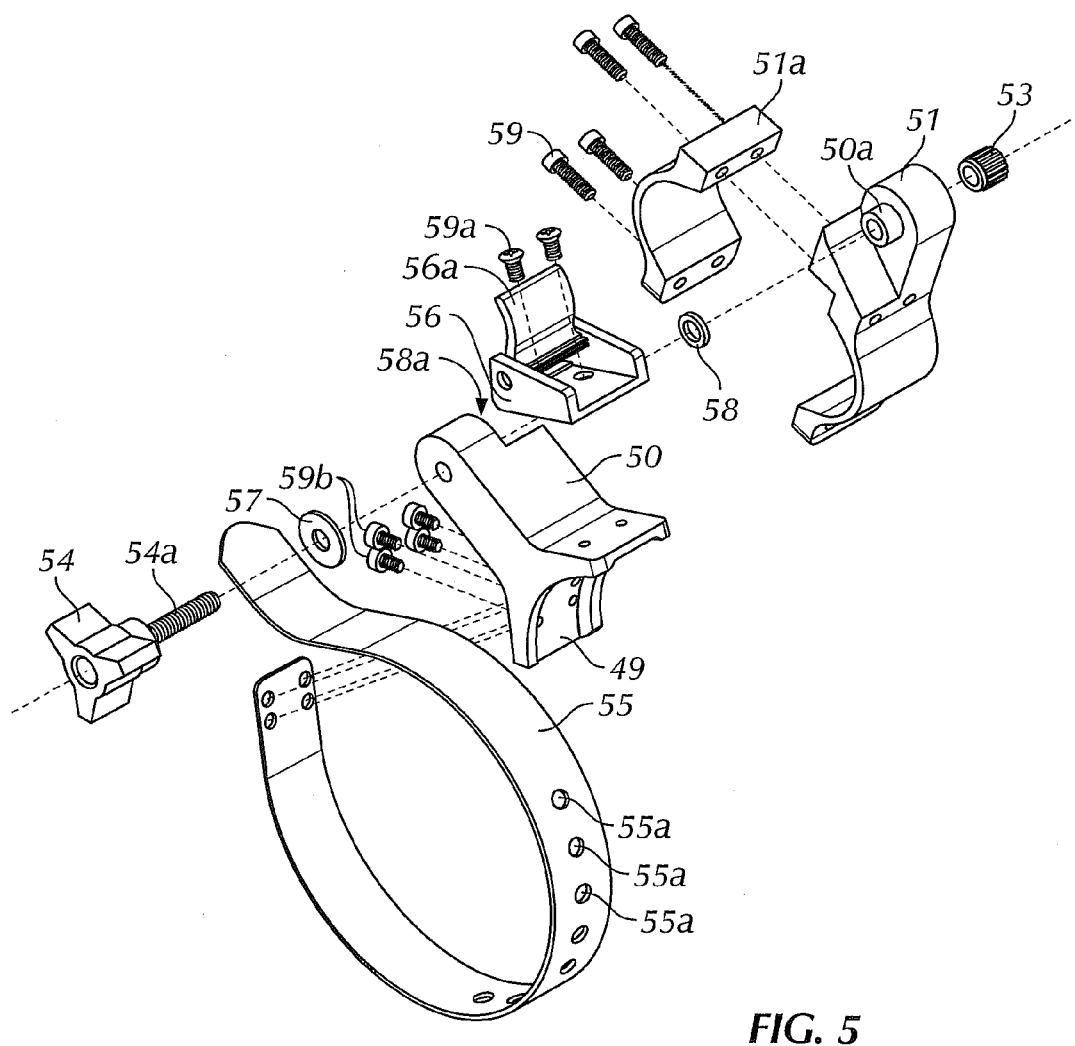
FIG. 5 is an exploded perspective view thereof.

The universal base 50 is secured to the spotting scope 200 by a flexible member or strap 55 and a strap lock 56. The length of the flexible member 55 depends on an outer perimeter of the individual spotting scope at a respective area of prism section 205. In one embodiment, the flexible member or strap 55 is secured with multiple fasteners 59b at one side of the universal base 50. The lock 56 is secured by any conventional means including fasteners 59a to a side of the universal base 50 opposite to that receiving the strap. The flexible member or strap 55 surrounds and tightens the spotting scope 200 down, and enters the lock 56 with the strap lock lever 56a being in an unlocked position. In FIGS. 2, 4 and 5 in the unlocked position the lever 56a points up. When strap 55 is tightened, so as to lock the spotting scope 200 and the strap lock level 56a is lowered within the assembly (see FIG. 1). Thus, the universal base 50, therefore the entire assembly is secured. In an alternate embodiment, upon the viewer/user concluding that the position of the universal base 50 is firmly established, the assembly can be made permanent. This eliminates the need for the strap 55 and the strap lock 56. Such permanent structure can be formed by securing the universal base 50 to the spotting scope 200 in any conventional manner.

Formation of the system of the invention is illustrated in FIGS. 1, 2, 4 and 5 showing how the zero magnification or red dot scope 100 is inserted and secured within the pivot assembly, between a clamp pivot 51 and a clamp saddle 51a. In the preferred embodiment this can be accomplished by loosening fasteners 59 and inserting the red dot scope from behind into a space 100L (see FIG. 4, for example). When the red dot scope 100 is installed in the desired position, the clamp saddle 51a is then secured by tightening the fasteners 59.

The embodiment of FIGS. 1-5 the universal base 50 is positioned on top of the high power or spotting scope 200. The arc-shaped portion 49 formed at the bottom part of the base 50 receives and accommodates the exterior of a great variety of scopes. In this manner, the universal base 50 of this embodiment can be positioned in a very stable way on a great variety of individual scopes. The flexible element or band 55 cooperates with the universal base 50 and the locking mechanism 56, so as to surround the spotting or high powered scope 200. The combination of clamp pivot 51 and clamp saddle 51a defining the receiving space 100L accommodates an exterior of practically any conventional red dot scope. The pivot arrangement allows adjustment of the system of the invention to practically any distance between human pupils. In this manner, the invention covers a great range of distances from the narrowest distance between eyes to the widest.

In the preferred embodiment, the universal base 50 and the clamp pivot 51 assembly are put together in the following manner. Initially, a spacer 57 is inserted over the adjustment locking knob's 54 engaging area 54a. Then the adjustment locking knob 54 is inserted into the hole at the top of the universal base 50. After that, a lock spacer 58 is inserted over the engaging area 54a of the adjustment locking knob 54 and into a bore 58a in same universal base 50. Finely, the clamp pivot 51 is brought together with universal base 50 when the boss 50a, at the top of the clamp pivot 51, is inserted into the bore 58a, at the top of the universal base 50. The process is finalized by the adjustment locking knob 54 being positioned into a tightening member 53, and then tightened.

The tolerances of the inner wall and the depth of the counter bore 58a in the universal base 50 and the outer wall and the height of boss 50a are similar to that of the pivot design assembly having a very snug fit without fully tightening the adjustment locking knob 54. When the adjustment-locking member 54 is fully tightened, the flat surface below and around the boss 50a comes into a contact with the flat outside surface around the counter bore 58a. In addition, the boss 50a simultaneously flattens the lock spacer 58 inside the counter bore 58a in the universal base 50 for a very positive lock.

When a slight adjustment in the pivot design assembly is needed, it takes only a limited adjustment of the adjustment-locking member 54. This loosens the positive lock by springing the lock spacer 58 from its flat position, yet keeping the universal base 50 and the clamp pivot 51 very snug. In this manner there is no wobbling when adjustments are made. As soon as the desired adjustment IPD is achieved, the adjustment locking member 54 is turned and the assembly is secured in its new setting.

Figure 2:
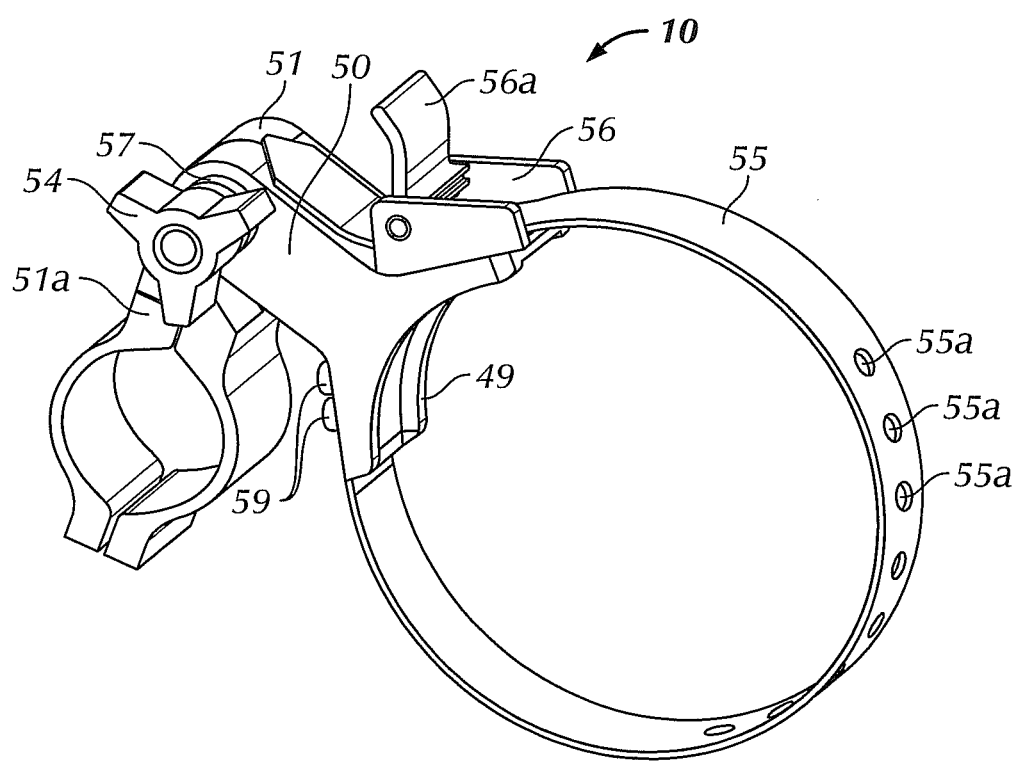
FIG. 2 is a perspective view of the pivot assembly (without the spotting and red dot scopes)
Figure 3:
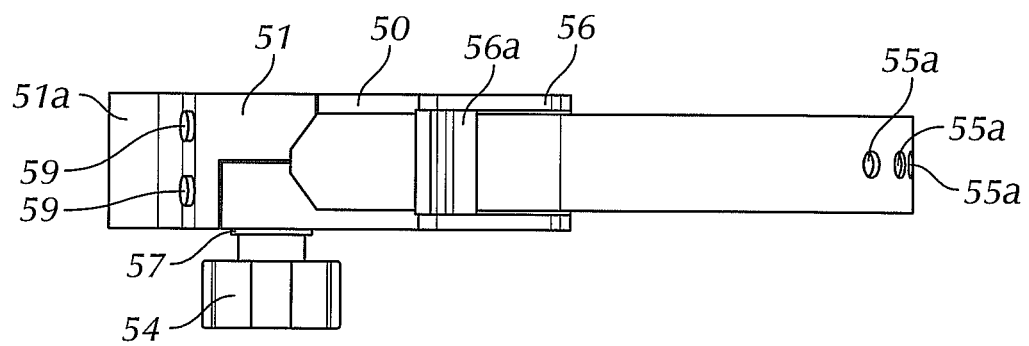
FIG. 3 is a top plan view thereof.

In operation of the system, initially the pivot assembly is loosely positioned on the spotting scope 200 (see FIG. 1). Then, the adjustment-locking member 54 having an engaging section 54a can be slightly loosened. Adjustable connection between a zero magnification scope viewed by a first eye of a user and a power scope viewed by a second eye of the user, the system comprising:

If the two eyepieces, 104 and 204 are not on a horizontal plane or their optical axes are not parallel to each other, the universal base 50 will then be moved as illustrated by the arrows in FIG. 4, until a horizontal plane is achieved. If, at that point, the distance between the eye pieces 104 and 204 changed, the clamp pivot 51 will also be moved up or down accordingly. Even if the IPD's exact measurement is not known, the same procedure will be followed by simply looking through the eyepieces 104 and 204, as the universal base 50 and the clamp pivot 51 are being adjusted until the viewer gets a visual and/or mental indication that the optimal IPD has been achieved. At this point the adjustment locking knob 54 and the strap lock 56 are tightened. Index lines visible on top of the universal base 51 and a corresponding index line (1) FIGS. 2, 3, and 5, can be provided so as to provide the viewer a reference for quick setting up in the future.

Although, the embodiment of FIGS. 1-5 have been described with reference to a particular design of the universal base 50 and the clamp pivot 51 including the clamp saddle 51a, it should be obvious that variations of this embodiment are within the scope of the invention. For example, the lock 56 can be secured to the universal base by any conventional manner, such as for example, gluing, welding, etc. In attaching, the clamp saddle 51a to the clamp pivot 51, any conventional way of accomplishing this task also forms a part of the invention. As an example, the scope 100 can have a standard 25 mm-28 mm inside diameter (ID), 30 mm outside diameter (OD).

Figure 6:
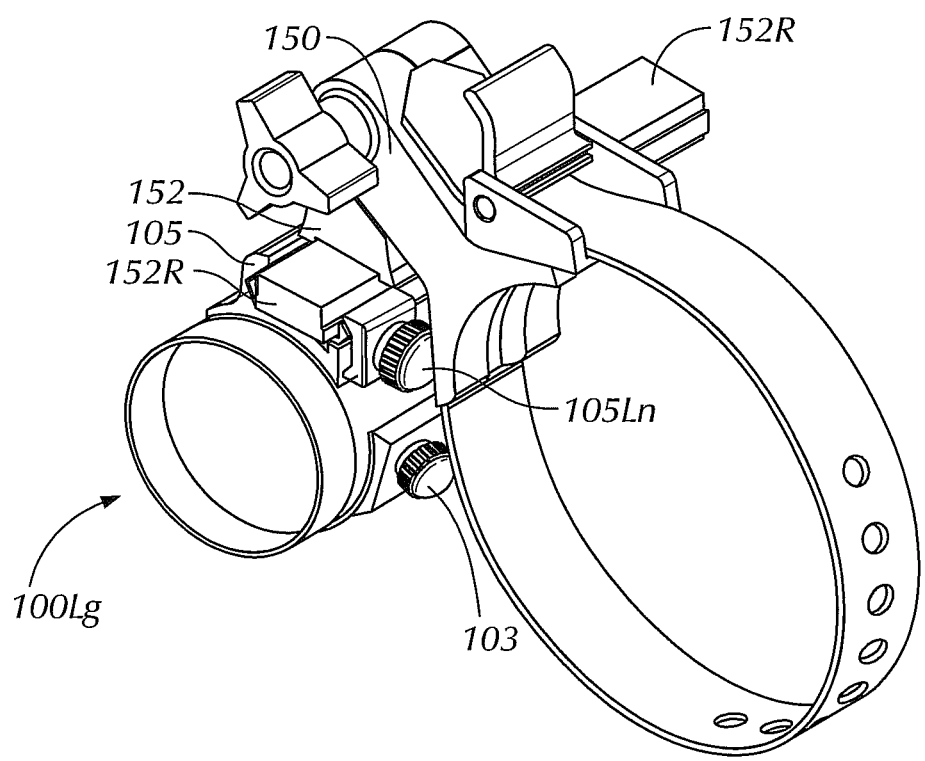
FIG. 6 is a perspective view of the pivot assembly having T-shaped configuration.
Figure 7:
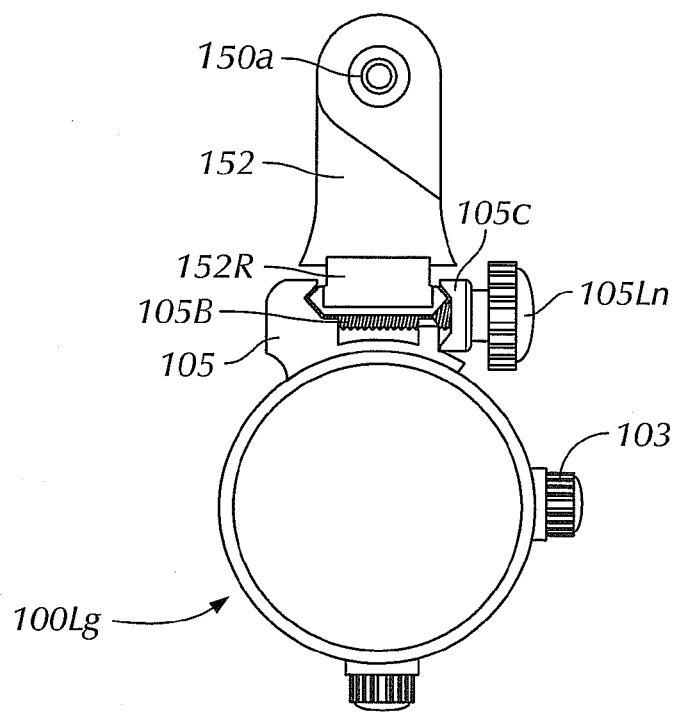
FIG. 7 is a rear elevational view of the T-shaped pivot arrangement.
Figure 8:
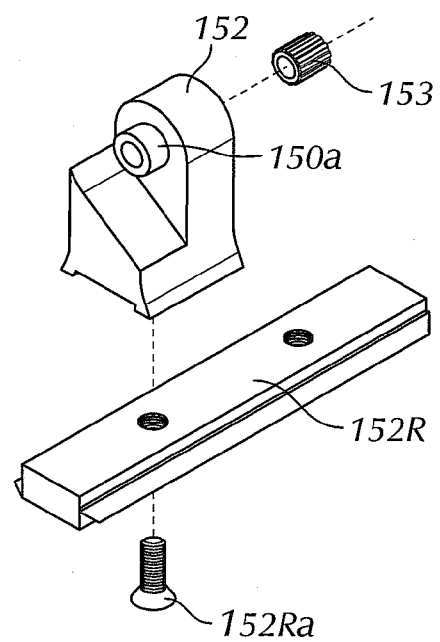
FIG. 8 is an exploded view thereof.

Referring now to FIGS. 6, 7 and 8, illustrating an embodiment of the system of the invention having a T-shaped pivot arrangement. The red dot scopes having larger inside diameter, and therefore even larger outside diameter, require a different way for attaching same to the universal base 50 of the previously discussed pivot design attachment. That is because many of such scopes are often provided with an integrated rail. Such rail 105 illustrated in FIGS. 6 and 7, is formed as part of the zero magnification, red dot scope tube. This makes it very difficult to use the clamp pivot 51 and the clamp saddle 51a of the previously discussed pivot design assembly to mount such a scope. In the embodiment of FIGS. 6-8 a T-shaped pivot 152 and the T-shaped pivot rail 152R are provided to accommodate the integrated rails 105.

As depicted in FIG. 6, the universal base 150 and the related parts, other than the T-shaped pivot 152 and pivot rail 152a, etc. are similar to those illustrated in FIG. 1-5. Furthermore, since the way the universal base 150 is attached to the spotting scope and the adjustments thereof, have been previously covered in substantial detail, and will not be repeated here.

As illustrated in FIG. 6, the T-shaped pivot 152 accommodates the large red dot scope 100Lg. FIG. 8 shows how the T-shaped rail 152R fits into the notch at the bottom of the T-shaped pivot 152 and is secured with a fastener 152Ra. The bottom of the T-shaped pivot 52 has been formed to receive the T-shaped pivot rail 152R. The two parts, 152 and 152R, are at substantially right angles to each other and are in line with each other. As seen in FIG. 8, the T-shaped pivot rail 152S extends on either side of T-shaped pivot 152. As seen in FIG. 8, there are multiple openings formed in the rail 152R. This allows enough flexibility in setting the rail 152R fore and aft into the T-shaped pivot 152. This allows the zero magnification or red dot scope with integrated mounting rails 105 to arrange its eyepiece 100Lg to align with the power or spotting scopes eyepiece 204.

FIG. 7, illustrates how the large red dot scope 100Lg is mounted on the T-shaped pivot rail 152R. First, the locking fasteners 105Ln are loosened. This allows the rail clamps 105C to move away from the integrated rail 105 widening the space between them until the T-shaped pivot rail 152R fits in between them. Then, by tightening the locking fasteners 105Ln, the rail clamps 105C squeeze the T-shaped pivot rail 152R against the large red dot scope 100Lg integrated rail 105, thereby securely mounting the large red dot scope 100Lg onto the pivot design attachment.

Since position of the rail 105 on the red dot scope is very specific, the arrangement of this embodiment is very precise. This embodiment does not allow a rotational motion of the red dot scope 100Lg within the bracket. The embodiment assures a longitudinal motion of the red dot scope within the bracket of the T-shaped arrangement and the radial motion of the red dot scope through the pivotal connection. However, the rotational motion of the red dot scope is inhibited.

Because the T-shaped pivot 152 and the previously discussed clamp pivot 51 use the identical universal base, the mounting procedure onto the spotting scope 200 is very similar. In addition, the process of adjusting for the proper IPD is also identical for both. This process has been fully described before and is not repeated here.

Figure 9:
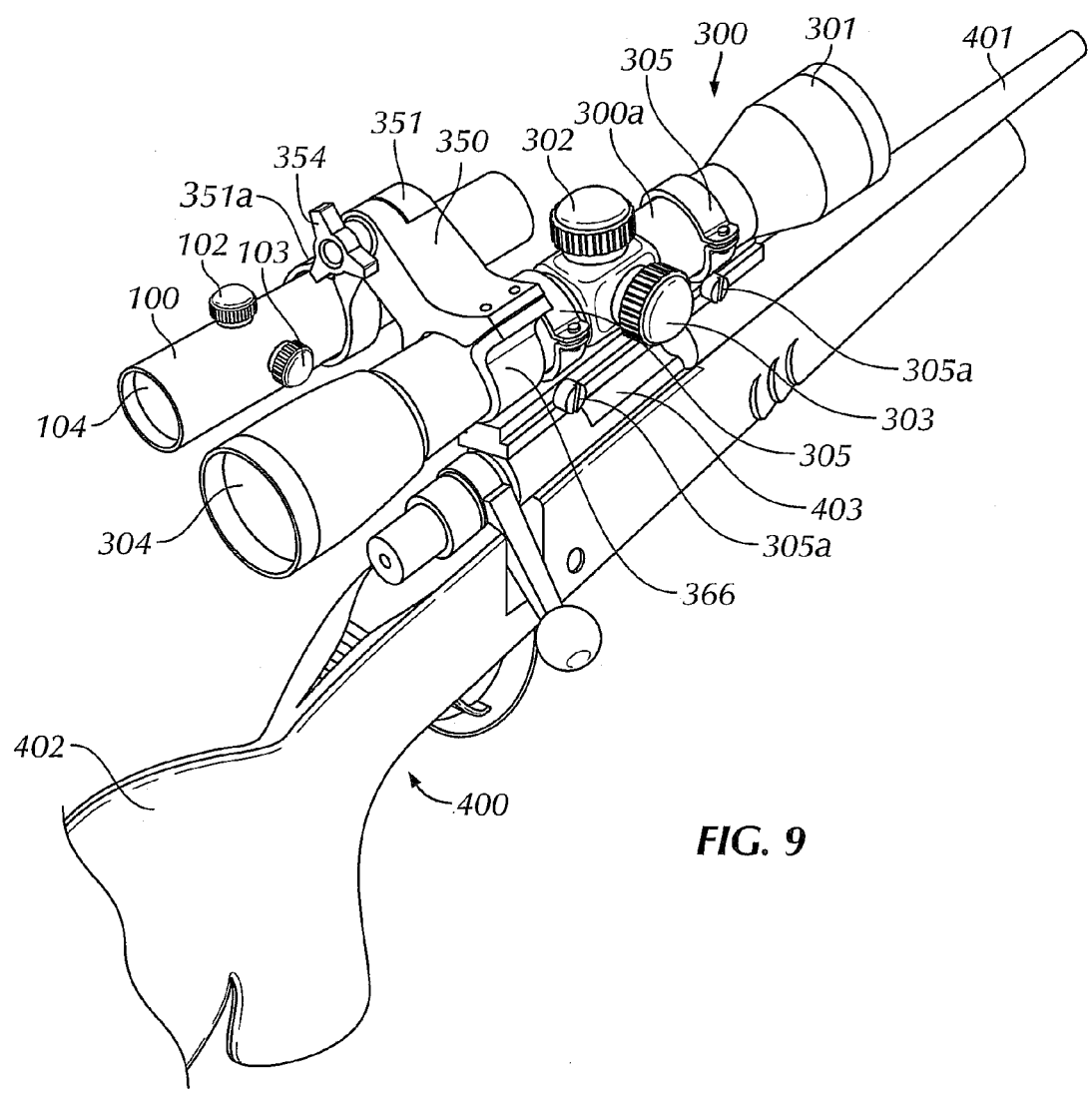
FIG. 9 is a perspective view of the pivot assembly mounted on a Long Rifle scope with a red dot scope attached.

Referring now to FIGS. 9-13 illustrating the embodiment of the pivot assembly of the invention adapted to accommodate a standard Long Rifle (LR) as it is mounted on a riflescope 300. FIG. 9 shows the pivot assembly where the red dot scope 100 is attached to the riflescope 300 associated with a rifle 400. FIGS. 10, 11, 12 and 13 show the assembly with the rifle and scopes being removed for better clarity.

Referring now to FIG. 9 showing that the riflescope 300 is attached to the rifle via mounting rings 305, attached to two mounting rings bases 305a, which are connected to the rifle 400 fore and aft of the breach area. In one embodiment, the universal base 360 is positioned over the riflescope tube 300 between the rear mounting ring 305 and the scope eyepiece 304. The location of attaching the universal base 60 to the universal base clamp 366 is based substantially on the following two factors: (1) the availability of an open space on the tube 300a; and (2) the location on the tube 300a of an adjusting knob 302 controlling fore or aft of the elevation 302 and an adjusting knob 303 controlling the windage. It is essential for the invention that when the red dot scope 100 is mounted on the rifle scope 300, the respective eyepiece 104 does not go aft of the rifle scope eye piece 304 and interfere with the shooter's preferred eye relief. For the purposes of the invention it is assumed that, the eye relief is the distance from the eye to the first lens in the eyepiece.

Figure 10:
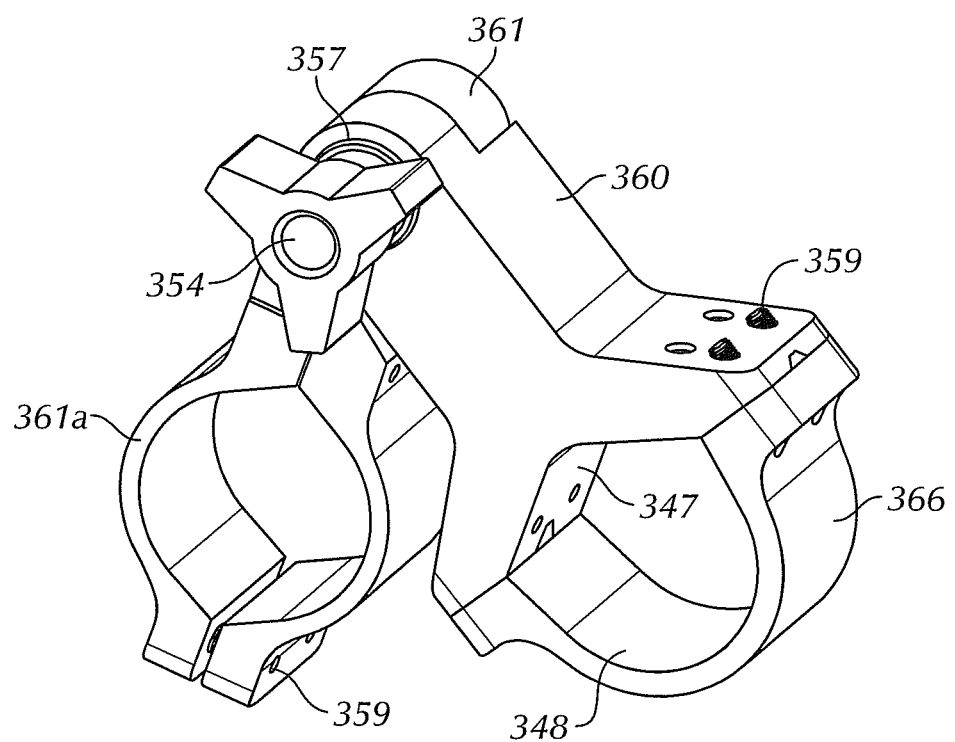
FIG. 10 is a perspective view of the pivot assembly with the riflescope and red dot scope removed.
Figure 11:
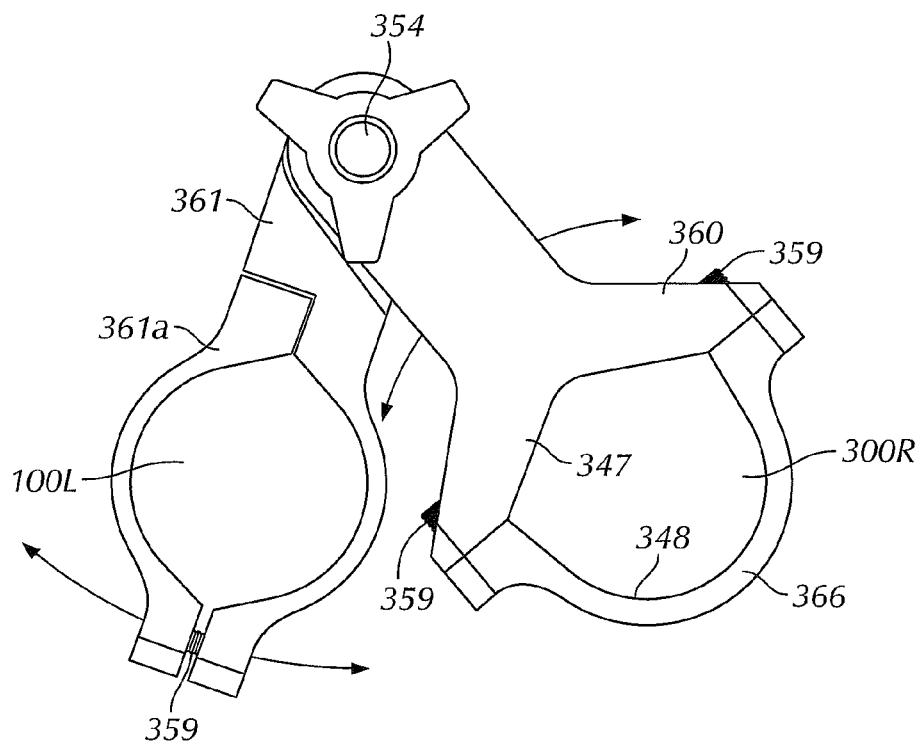
FIG. 11 is a rear elevational view thereof.
Figure 12:
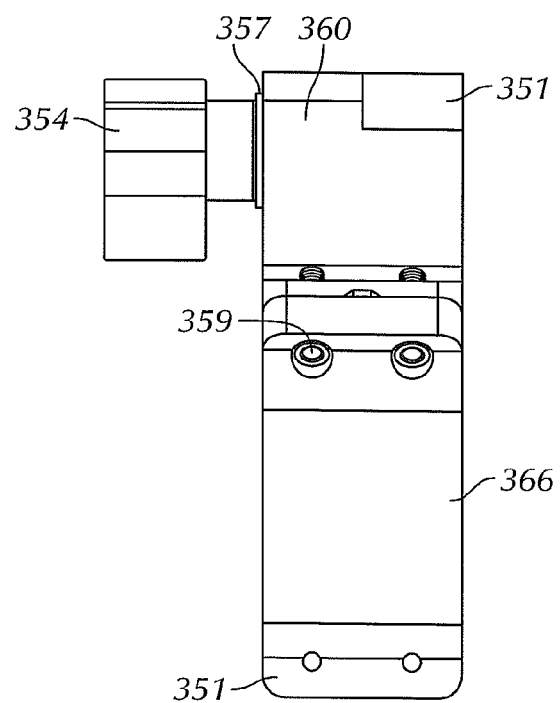
FIG. 12 is a side elevational view thereof.
Figure 13:
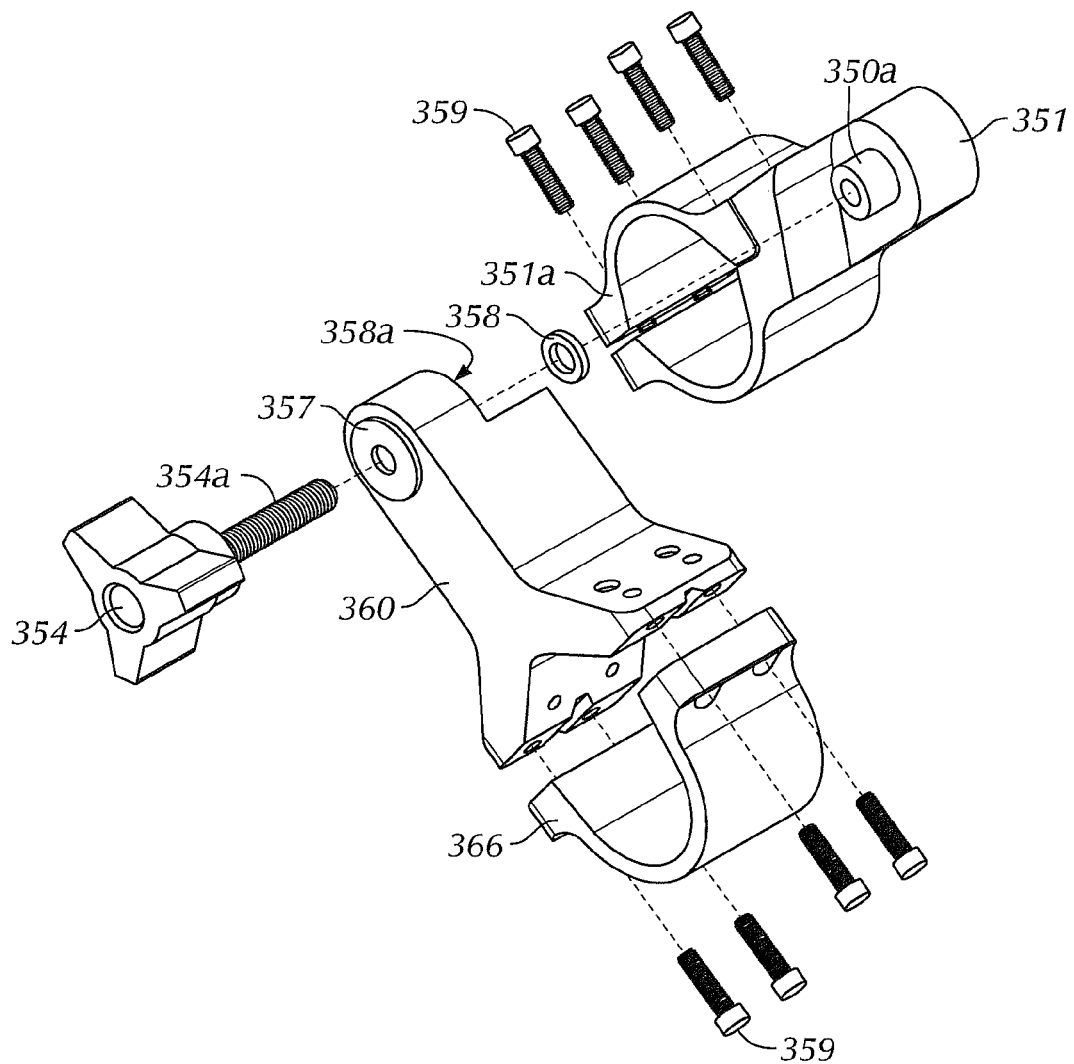
FIG. 13 is an exploded perspective view thereof.

Referring now to FIGS. 10, 11 and 13 illustrating systematic relationships between the scopes 100 and 300. As the initial step, the bottom of the universal base 360 is first mounted on to the riflescope tube 300a. It is then matched with the universal base clamp 366 mounted at the bottom of the rifle scope main tube 300a and is secured by fasteners 359, which enter through universal base clamp 366 into a universal base 360 (see FIG. 13) and are only snugged in.

Then, the red dot scope 100 is mounted in between the clamp pivot 361 and the clamp saddle 361a with the fasteners 359 entering through clamp saddle 361a and snuggly engaging the clamp pivot 361 (see FIGS. 10 and 11) and are only snugged in.

After that the adjustment-locking member 354 having an engaging section 354a, is slightly loosened and the spaces between the left space for the red dot scope 100L and the right space for the riflescope 300R are set for the IPD of a user. This is accomplished by tilting the clamp pivot 361 up or down as illustrated by the arrows shown in FIG. 11. Such motion is achieved by using the boss 350a, the corresponding bore 358a and the engaging section 354a of the adjustment member 354 as the pivoting point (see FIG. 13). When the center of the left space for the red dot scope 100L, or the red dot scope eyepiece 104 and the center of the right space for the riflescope 300R, or the riflescope eyepiece 304, correspond to the individual viewers IPD, the adjustment member 354 is tightened to provide a positive lock.

In view of the interference of the rifle stock cheek rest 402, in order for the shooter to look through the center of the rifle scope 300, the head tilts at an angle towards the rifle. This puts the left eye above the right eye. To maintain the ability of the shooter to look through the centers of both scope eyepieces, the universal base 360 should be tilted from a horizontal position to one matching the angle of the head leaning. This is done by using the rifle scope 300 as the pivoting point, as shown by the arrows in FIG. 11. The process should be accomplished by emanating to the left and right from the universal base 360 until the right eye is looking through the center of the rifle scope eye piece 304 and the left eye is looking through the center of the red dot scope eye piece 104. When that is achieved, the fasteners 359 attaching the universal base clamp 366 into the universal base 360 can be finally tightened.

The embodiment of FIGS. 9-13, illustrates installation of the target acquisition assembly of the invention on a rifle. This occurs in such a manner so as to provide a pivotal connection between the red dot scope and the high power scope of the rifle, and to accommodate various designs of the rifle scopes. As illustrated in FIGS. 10 and 11, an inner area 348 of the base clamp 366 has a u-shaped configuration, whereas the bottom inner area 347 of the universal base 360 has a v-shaped configuration. The combination of the u-shape and v-shape areas in the receiving opening 300R, enable the invention to accommodate a great variety of the rifle scopes. Since the u-shaped area 348 of the base clamp receives a cylindrical portion of the rifle scope housing, the v-shape area 347 locks the rifle scope housing within the u-shaped seat of the base clamp 366.

It should be obvious that many variations and modifications of the above-discussed pivot assembly of FIGS. 9-13 are contemplated by the invention. For example, the adjustment member 354 can be substituted by other conventional arrangements controlling the motion between the left and right spaces of the assembly. Furthermore, the universal base clamp 366 can be attached to the universal base 360 by any conventional means. This is also applicable for the assembly of the clamp pivot 351, etc.

The embodiment illustrated in FIGS. 14-17 is provided to facilitate carrying a rifle with the mounted target acquisition assembly for substantial distances, or when a user is running with the rifle. When the rifle is carried in front, at the side or shouldered, the pivot assembly, as it is mounted on the rifle, might interfere with such applications because of its side protrusion. In the embodiment of FIGS. 14-17 this drawback is minimized through a provision of a quick release mechanism disposed between the bottom of the universal base 60T and the universal base clamp 66T on the opposite side of the red dot scope 100 (right side shoulder of universal base 60T). Certain elements of the present embodiment have been disclosed with reference to the previously discussed tactical pivot assembly and the long rifle pivot assembly and will not be repeated in this part of the application.

Figure 14:
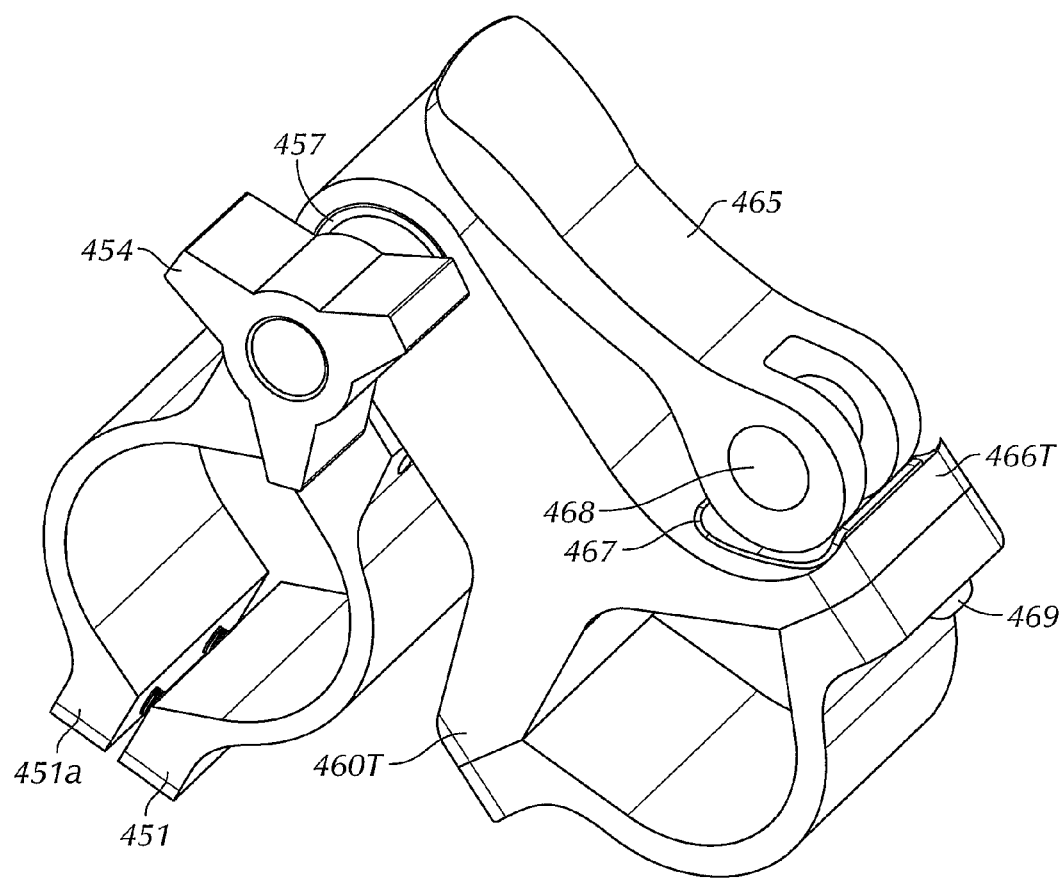
FIG. 14 is a perspective view of a tactical rifle embodiment of the pivot assembly.
Figure 15:
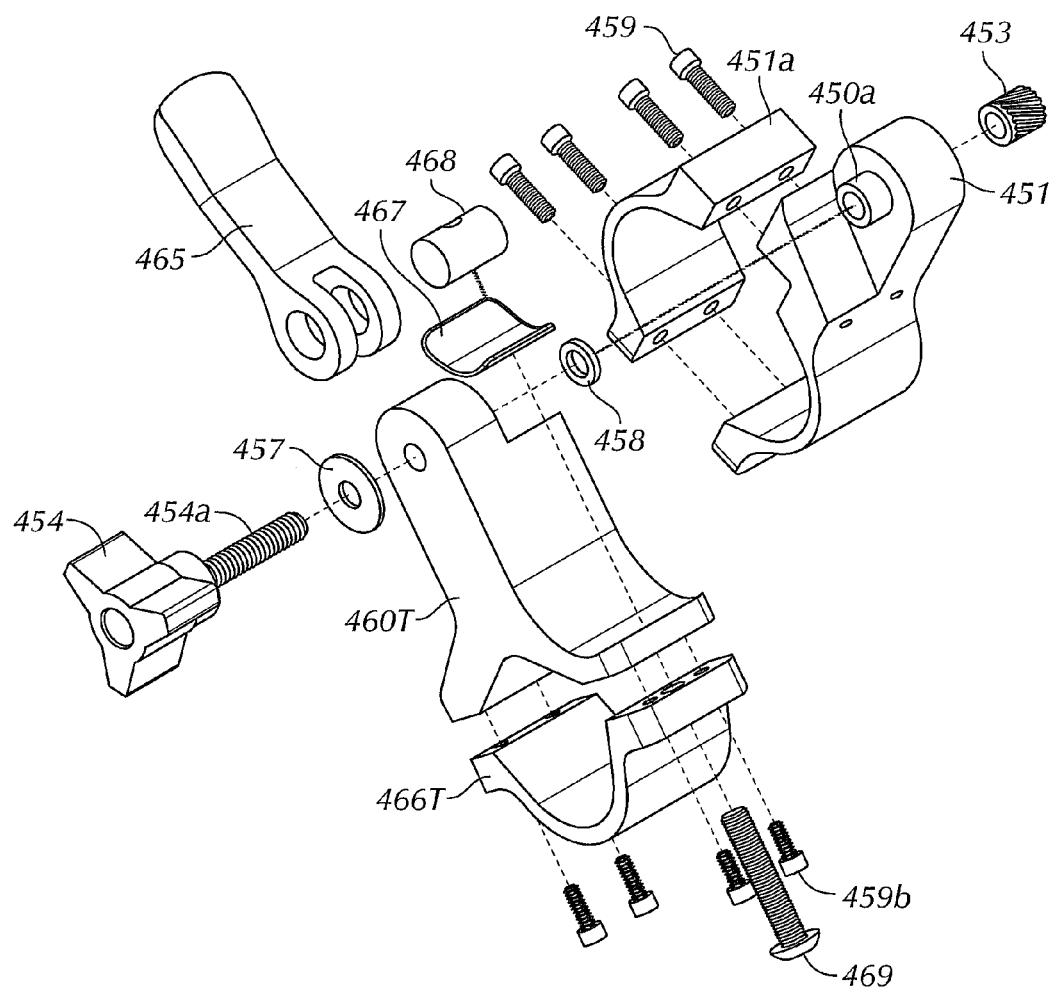
FIG. 15 is an exploded perspective view thereof.
Figure 16:
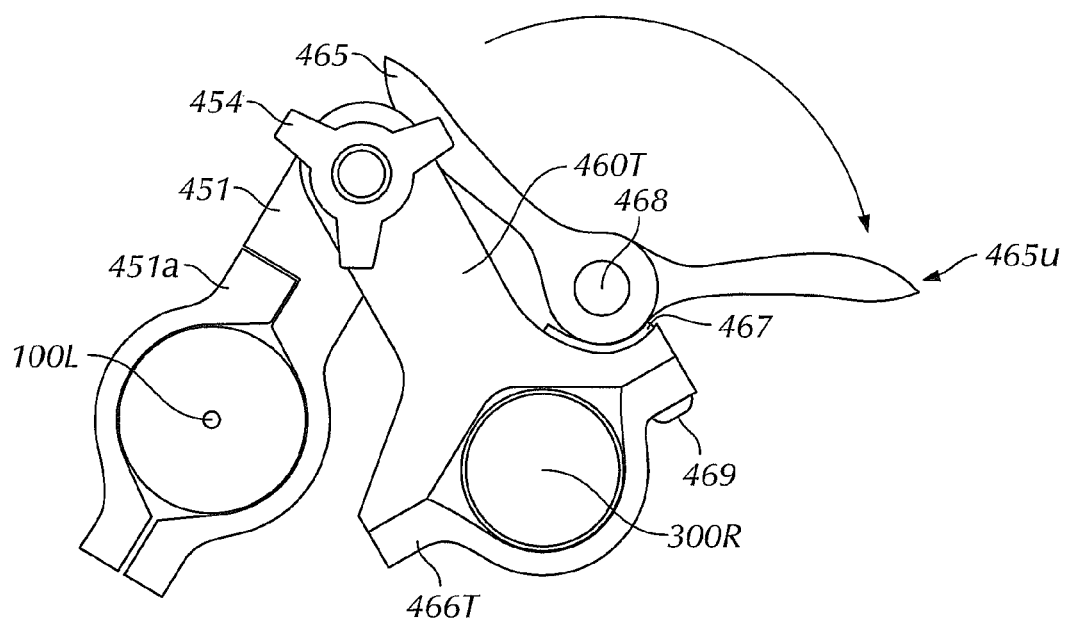
FIGS. 16 and 17 are elevational rear views thereof.
Figure 17:
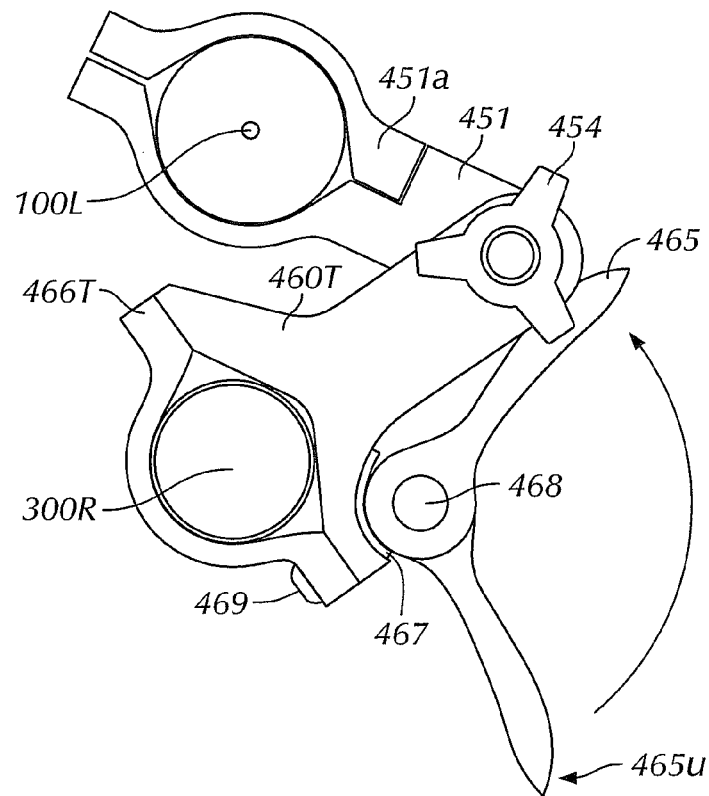

As depicted in FIGS. 14 and 15, to bring the universal base unit together, the universal base clamp 466T is connected to the universal base 460T by any conventional means including the fasteners 469. A spacer 467 is inserted over it and pressed against a shoulder of the universal base 460T. As depicted in FIGS. 15-17, the cross dowel 468 is inserted into the openings at a bifurcated bottom area of the cam lever 465 and secured. In one embodiment of the invention fasteners can be used for the securing purposes, so as to be placed into the cross dowel 468 and snugged, while the cam lever is in the down position 465u. The cam lever 465 releases and squeezes one side of the universal base 460T. The securing members 469 are snugged into the bottom of the universal base 460T. The fasteners 459b attaching the other side of the universal clamp 466T to the universal base 460T, remain tight during the entire process.

FIG. 16 illustrates how the cam lever 465 upon being lowered to position 465u allows the entire pivot assembly 640T to be tilted. To accomplish this task, the rifle scope main tube 300a/300R is used as a fulcrum/pivot to where the red dot scope 100 is placed directly above the rifle scope 300. That position is then secured by raising the cam lever 465 from the position 465u to the position where the cam lever 465 touches the top of the universal base 460T, which tightens the universal base clap 466T against the universal base 460T. As depicted in FIG. 17, if there is a need for close quarters quick shot, the red dot scope 100 can be used to take that shot because the scopes are still in parallel alignment. When the need to return to the sniper mode arises, the process is reversed from FIG. 17 to FIG. 16. In this manner, the cam lever 465 is lowered, the universal base 460T, and therefore the assembly, is pivoted back to the left to its optimal IPD position. The lever is raised to lock it after the adjustment is complete. These adjustments are rather fast and take no more than a second or two.

As discussed above, when a user is walking or running with a rifle along his or her side, or when shouldering the rifle, the red dot arrangement often interfere with a body of the user. The arrangement of the embodiment of FIGS. 14-17 allows alignment of the scopes in a straight horizontal plain with the rifle. Thus, the scopes are positioned flat against the body or against the back when shouldered. The above-discussed quick release mechanism is provided to facilitate quick angle and/or radial adjustment of the entire target acquisition system, so that the red dot scope 100L is adjusted with respect to the high power scope 300R of the rifle. This mechanism provides fast adjustment to practically any desired position of the red dot scope 100L with respect to the high power rifle scope 300R. The adjustment includes a rotational motion of the assembly, including the red dot scope with respect to the longitudinal or optical axis of the rifle scope. Various radial positions of the red dot scope 100L are achieved by simply releasing and locking the cam lever 65 and the respective cam mechanism.

Figure 18:
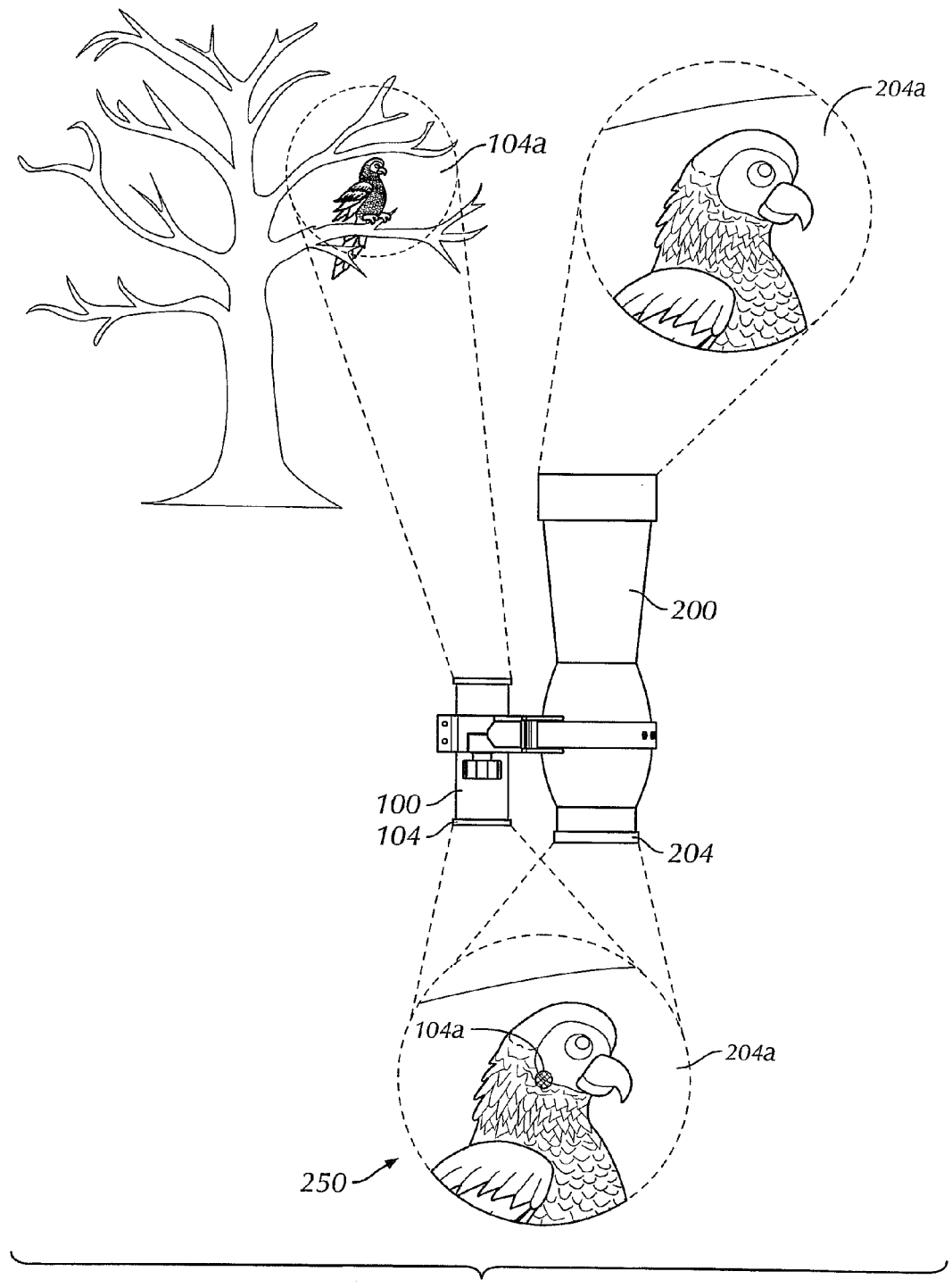
FIG. 18 is a schematic depiction of the principles of the invention.
Figure 22:
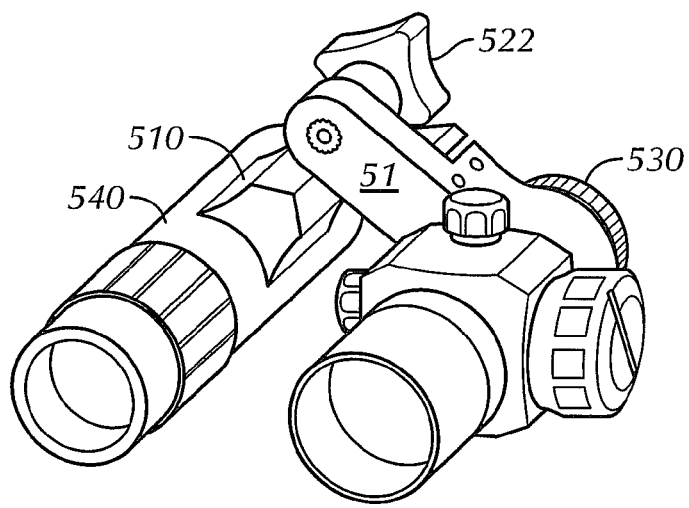
FIG. 22 is a perspective view of a small scope setup.
Figure 23:
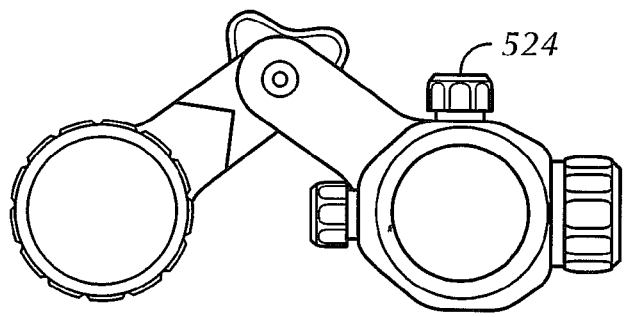
FIG. 23 is a front view of thereof.
Figure 24:
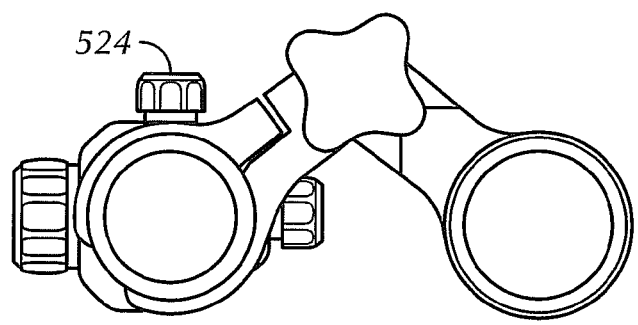
FIG. 24 is a rear view thereof.

Referring now to FIG. 18 illustrating principles of the invention. The left eye of a user is looking through the eyepiece 304 of the zero magnification or red dot or holographic scope 300 and finds an object such as a bird for example. The right eye is simultaneously looking through the eyepiece 404 of the high power scope 420. The result is the immediate viewing of the magnified view 404A of the bird object. The longer the viewer looks at the magnified view, the less he/she notices the red dot or holographic. At the moment the bird flies away, the brain of the user shifts some of its focus from the magnified view to the reemerging red dot or holographic in the wide field of view of the red dot or holographic eye piece 304. The result is that the target does not disappear from the magnified view.

It is illustrated in FIG. 18 that looking with the left eye through the zero magnification or the red dot or holographic scope 300 the user acquires a wide field view 304A and sees a large area around the bird object. On the other hand, the right eye looking through the high power scope 420 acquires an enlarged view 304A of the bird object. The right eye has a much narrower field of view 404A and only sees a part of the object, such as for example a head of the bird. The resulted view 350 is the combination of the zero magnification of the red dot or holographic view 304a and the magnified view 404a provided by the system of the invention.

Referring now to FIGS. 19-24, which illustrate a further embodiment of the system of the invention having a pivot-type visual target acquisition scope arrangement. The arrangement comprises a target acquisition assembly 500 with the universal base 510 and the clamp pivot 520 adjust-ably combining/connecting a zero magnification, red dot or holographic scope 530 to a power scope or a spotting scope 540.

Figure 30:
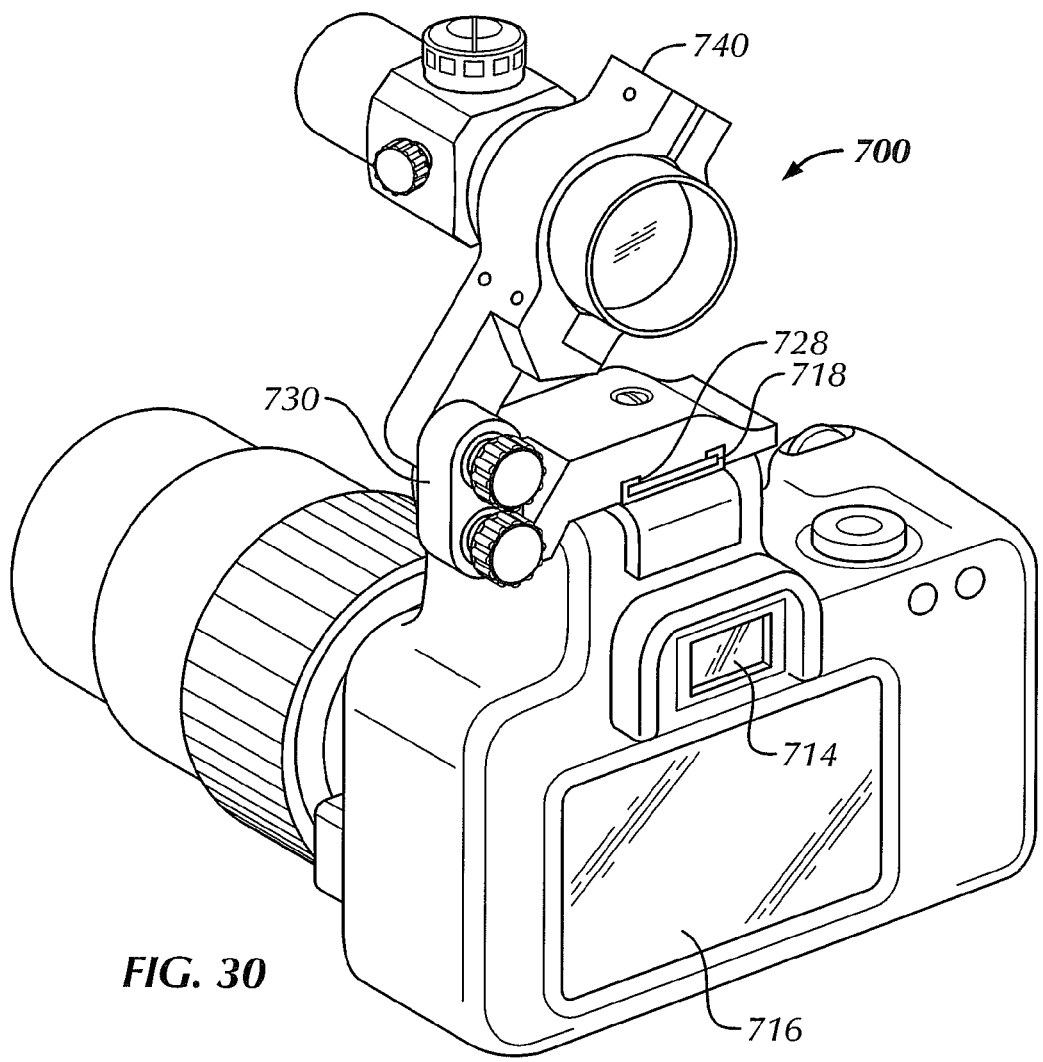
FIG. 30 is a perspective view of the system with the camera set up for vertical photography.
Figure 31:
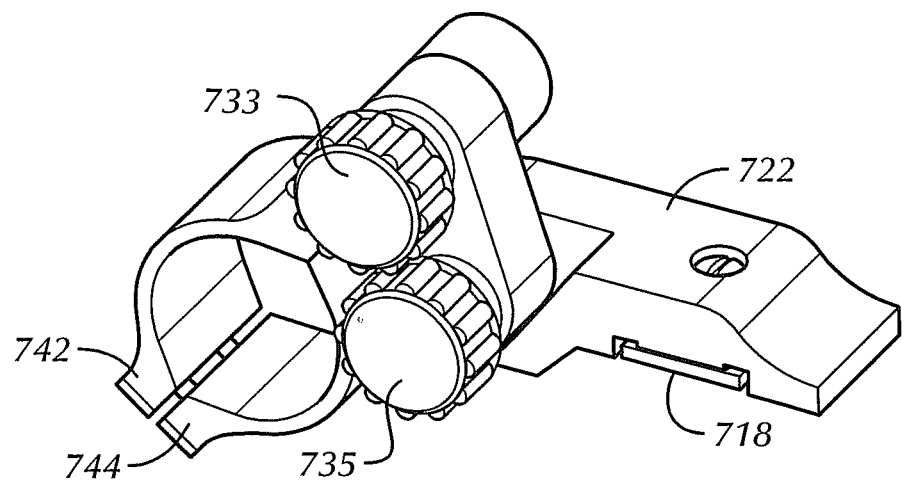
FIG. 31 is a perspective view of the attachment forming a part of the system.
Figure 32:
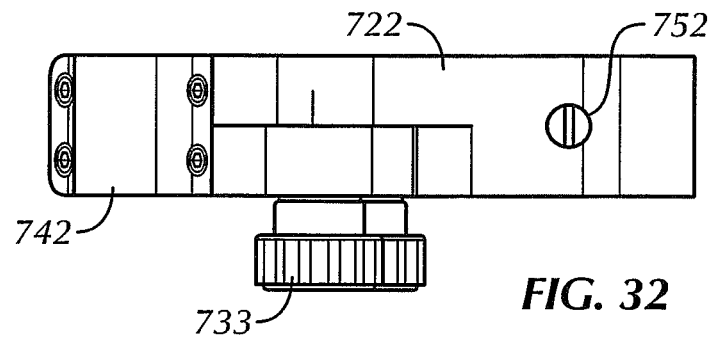
FIG. 32 is a top view thereof.
Figure 33:
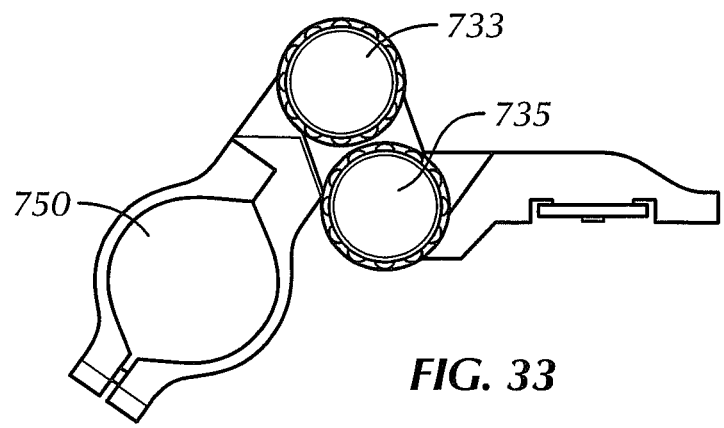
FIG. 33 is a front view thereof.

A universal base 510 is associated with a prism housing the spotting scope 540. The position of where the base is placed, fore or aft, determined according to configuration of the individual spotting scope and red dot or holographic scope. It is essential that both eyepieces 532 and 542 are disposed within the same plane and at an approximate even distance from the viewer's eyes when placed against the scopes in a face on position, not turned sideways. In FIG. 30, which is a rear or end view of the assembly, the semicircle, centered on the pivot point of the assembly 10, shows that the distance to the center of both eyepieces is very similar.

In the embodiment of FIGS. 19-24 the universal base 520 is positioned on top of the high power or spotting scope 540. The arc-shaped portion formed at the bottom part of the base 510 receives and accommodates the exterior of a great variety of scopes. The pivot arrangement allows adjustment of the system of the invention to practically any distance between human pupils. In this manner, the invention covers a great range of distances from the narrowest distance between eyes to the widest.

In operation of the system, initially the pivot assembly is loosely positioned on the spotting scope 540. Then, the adjustment-locking member 522 can be slightly loosened. Adjustable connection is between the zero magnification scope or holographic scope 530 viewed by a first eye of a user and the power scope 540 viewed by a second eye of the user.

If the two eyepieces, 532 and 542 are not on a horizontal plane or their optical axes are not parallel to each other, the universal base 510 will then be moved, until a horizontal plane is achieved. If, at that point, the distance between the eye pieces 532 and 542 changed, the clamp pivot 520 will also be moved up or down accordingly. Even if the IPD's exact measurement is not known, the same procedure will be followed by simply looking through the eyepieces 532 and 542, as the universal base 510 and the clamp pivot 520 are being adjusted until the viewer gets a visual and/or mental indication that the optimal IPD has been achieved.

Figure 25:
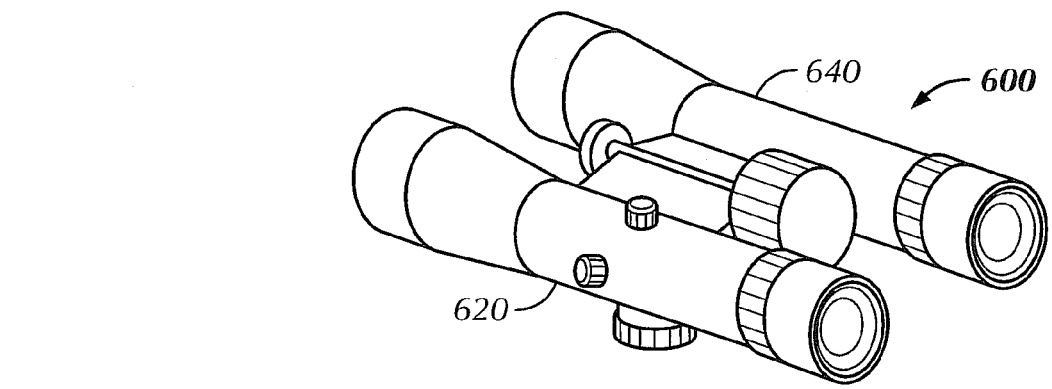
FIG. 25 is a perspective view of a binocular system according to another embodiment of the invention.
Figure 26:
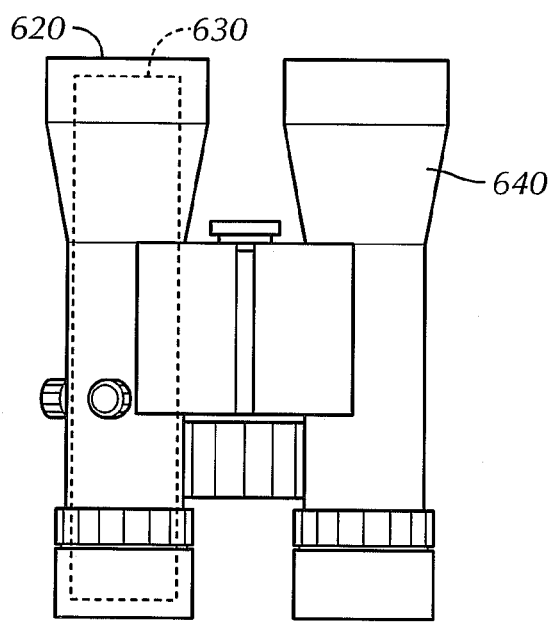
FIG. 26 is a top view of thereof.
Figure 27:
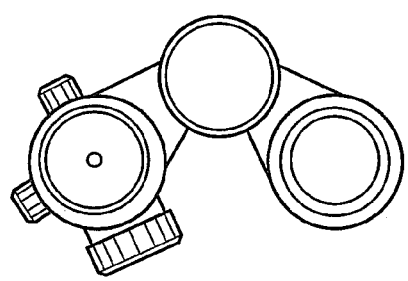
FIG. 27 is a rear view thereof.
Figure 28:
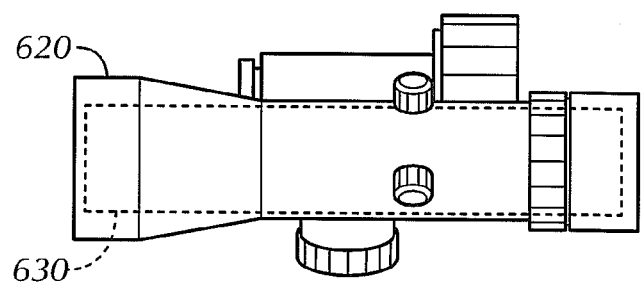
FIG. 28 is a left side view thereof.

Referring now to FIGS. 25-28 illustrating a binocular system 600 according to another embodiment of the invention. This system is in many respects similar to the previously discussed system of FIGS. 19-24. It is illustrated in FIGS. 25, 26, and 28 that zero magnification, holographic or red dot scope 630 is disposed inside a substantially hollow left tube 620 of the system which is movably connected to a power scope 640. The binocular system 600 of the invention can be hand-held, mounted on the tripod or mounted on a helmet of a user.

Figure 29:
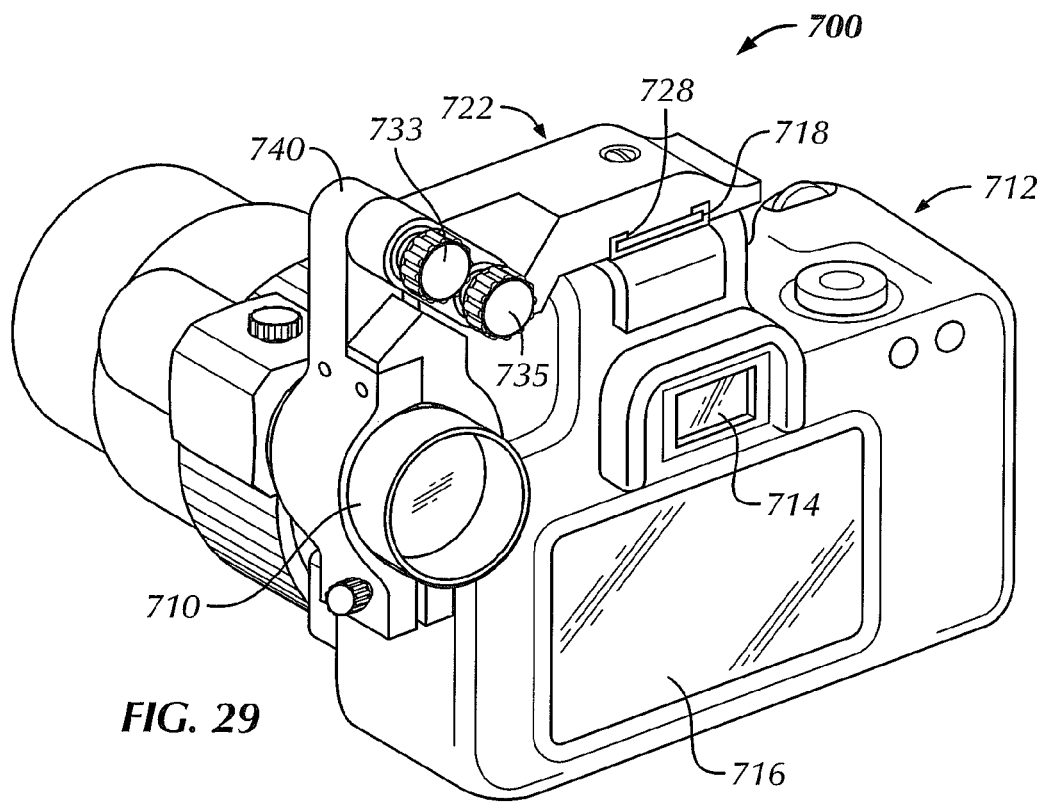
FIG. 29 is a perspective view of a further embodiment of the invention, which is a system with a camera set up for horizontal photography.

Reference is made now to FIGS. 29-34 disclosing a further embodiment of the invention. FIG. 29 illustrates a system 700 of this embodiment with a camera setup 712. In this embodiment, the camera 712 may be any type of camera, such as for example a 35 mm camera, Advanced Photo System (APS) camera, one-time-use camera, digital photo camera, digital video camera, etc. The connecting arrangement 720 is adapted for connection with standardized flash accessory shoe 718 of the camera. A zero magnification, red dot or holographic scope 710 is inserted in the clamp setup of the arrangement 720. The camera includes a viewfinder 714 and/or a camera window 716 through which a photographer can view an image to be photographed. The photographer's view through the viewfinder is essentially a preview of the image that will be captured by the camera. The photographer should be able to discern by looking through the viewfinder which objects will fall within those boundaries and which objects will fall without. FIG. 29 shows the system 700 with the camera adapted for horizontal photography. On the other hand, FIG. 30 illustrates the system 700 with the camera adapted for vertical or portrait photography. The connecting arrangement 720 is adapted for association with a standardized flash accessory shoe 718 of the camera.

There are known two standardized flash accessory shoe standards. One is applicable for the Nikon-type cameras and the other for the Cannon-type cameras. Such accessories are slightly different from each other.

As illustrated in FIGS. 29-34, the system 700 is provided for movable connection between the camera 712 and the zero magnification or the red dot scope 710. The system consists of a connecting arrangement 720 movably integrated with the zero magnification assembly 740. The connecting arrangement consists of a connecting base 722 having an upper portion 724 and a lower portion 726. An engaging recess 728 is provided at the lower portion 726 for slidable engagement with a shoe 718 of the camera. A connecting part 736 extends outwardly from the connecting base 722, forming a part of the recess 728 adapted to movably accommodate a swivel arm 730.

Figure 34:
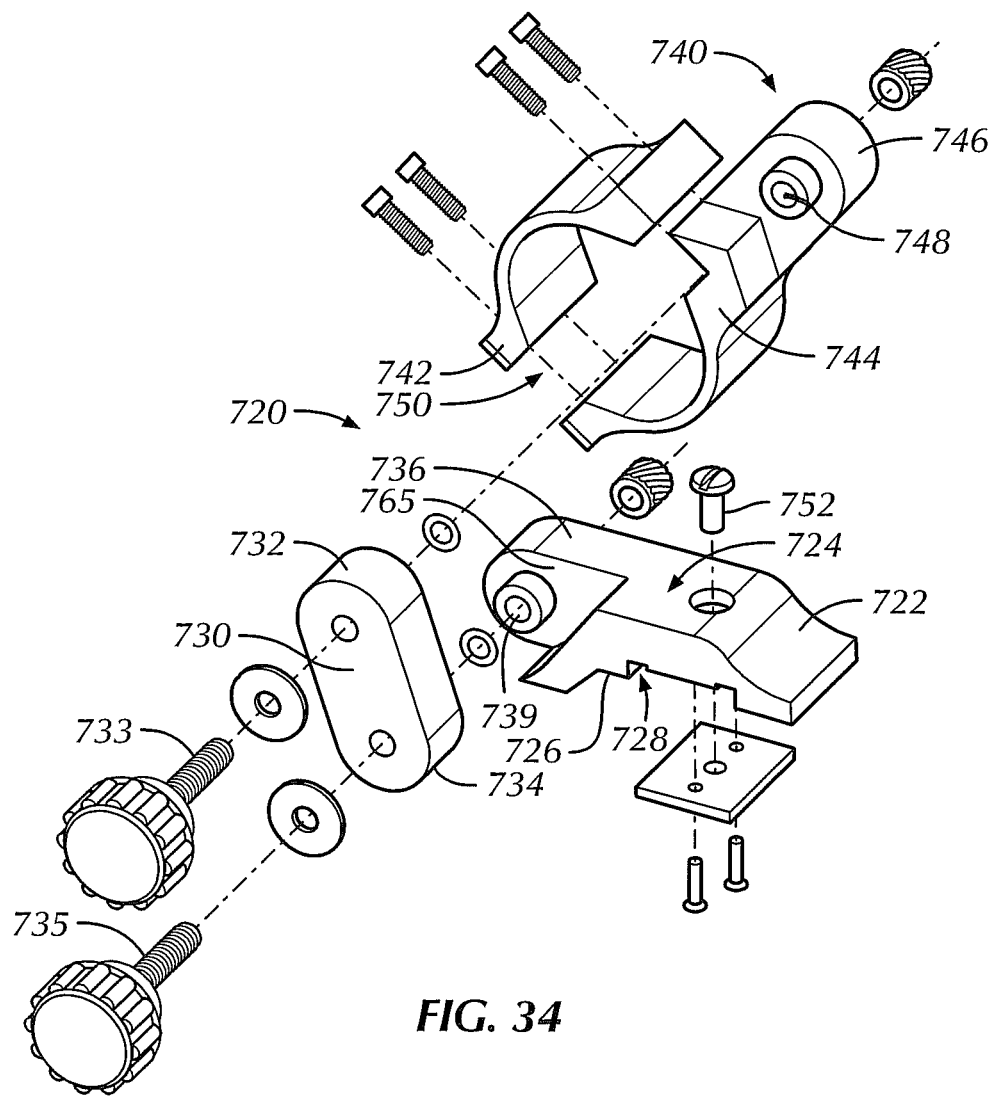
FIG. 34 is an exploded view of the attachment forming a part of the system.
Figure 35:
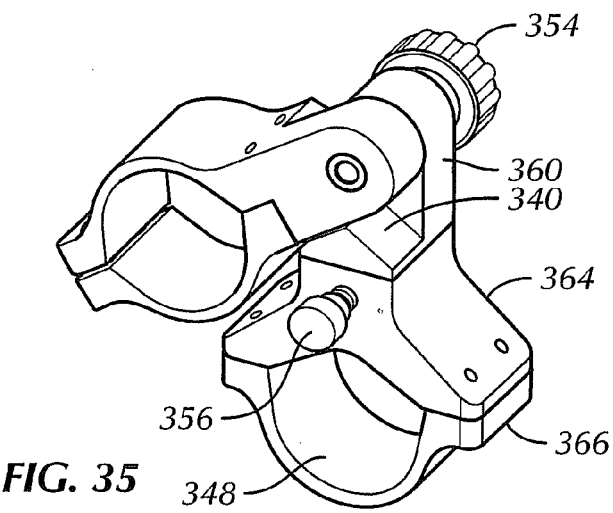
FIG. 35 is a perspective view of a modified embodiment of a pivot assembly with the riflescope and red holographic dot scope removed.
Figure 36:
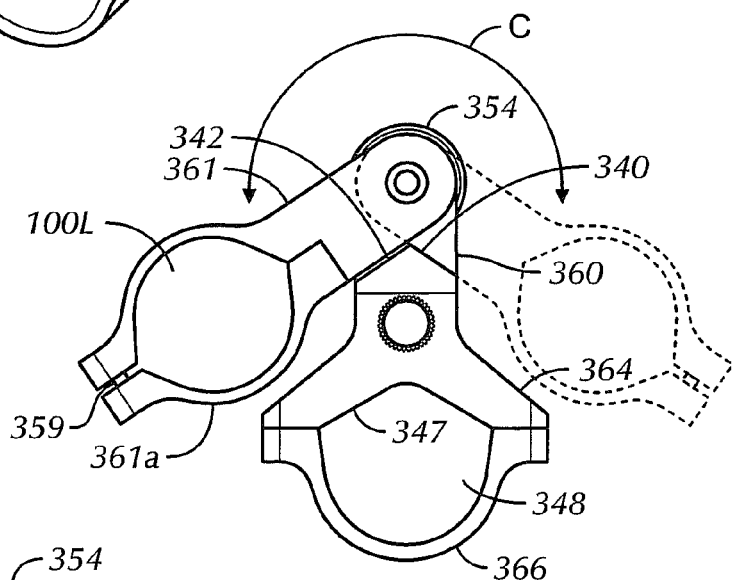
FIG. 36 is a rear elevational view thereof.
Figure 37:
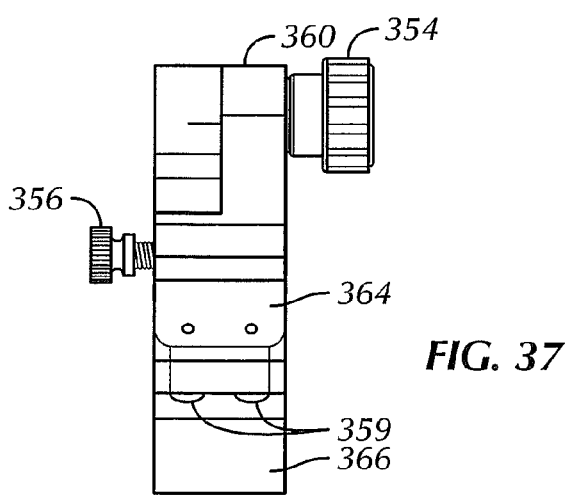
FIG. 37 is a side elevational view thereof.

As best illustrated in at least FIG. 34, the swivel arm 730 extends between the top part 732 and a bottom part 734. A top swivel member 733 is movably received within the top part 732, whereas a bottom swivel part 735 is rotatably accommodated at the bottom part 734. An aperture 739 formed at a vertical wall of the engaging recess 765 is adapted for rotatable/threadable cooperation with an engaging portion of the bottom swivel member 735.

As also illustrated in at least FIG. 34, a zero magnification scope assembly 740, consists a saddle part 742 adapted for connected with a pivot part 744. The combination of the pivot and clamp parts define a receiving space 750 which can accommodate an exterior of practically any conventional zero magnification or red dot scopes. A receiving portion 746 extending outwardly from the pivot part 744 is formed with an aperture 748 which is adapted to movably/threadably accommodate an engaging portion of the top swivel member 733.

In operation of the photographic camera system 700 illustrated in FIGS. 29-34, initially the swivel members 733, 735 are slightly loosened, and the red dot or holographic scope 710 is positioned to be within the same horizontal plane as the plane of the view finder 714/window 716 of the camera 712. The distance from the center of the viewfinder 714 to the center of the holographic or red dot scope 710 is set to match Interpupillary distance (IPD) of the user/photographer. Both pivot members 733, 735 are now tightened.

It is essential to match position of the mark or the red dot or the holographic mark to rest on the target and for the same image appear in the center of the camera's viewfinder. It is recommended to arrange the holographic mark or the red dot to overlap or almost overlap the center of the viewfinder at infinity.

With the camera set on a tripod, fine adjustments begin by finding a stationary visual target, such as the top of a tower or a chimney, at ½ to 1 mile away and placing it in the center of the viewfinder or window.

Assuming the IPD is set, fine adjustments can be accomplished using the horizontal adjustment knob 735 and the vertical adjustment knob 733 associated with the holographic or red dot scope. In use optional adjusting knobs covers are removed and by turning the set-screw (slotted) clockwise, the mark will move towards the adjusting knob. Conversely, turning it counter clockwise will move the mark away from the adjusting knob.

From this point on, whether looking for a star, a bird in the sky or in the bush, if the red dot is placed on the visual target, it will appear in the photographer's magnified view, even if slightly of center.

The photographic camera system of the invention involves aligning the connecting arrangement 720 with the standardized flash accessory shoe 718 of the camera. Thus, the connecting base 722, the swing arm 730 and the assembly 740 with the red dot scope 710 are movably accommodated at the top of the camera. The fastener 752 associated with the connecting base 722, is then tightened to secure the arrangement to the camera shoe 718.

With the swivel members 733, 735 and clamp saddle knobs slightly loosened, the zero magnification, red dot or holographic scope 710 can be positioned at the same horizontal level/plane as a view finder/window 714, 716 of the camera. The photographic system of the invention is capable of arranging vertical and horizontal shots. The distance from the center of the viewfinder to the center of the zero magnification, red dot or holographic scope is set to match the user's/photographers IPD.

To achieve better results, it is recommended to position the red dot or holographic scope 710 in the receiving space 750, so the elevation adjusting knob or the top swivel member 733 to be oriented upwardly (see FIG. 30). Fine adjustment can be made using a horizontal or bottom swivel member 735 and top 7333 red dot or holographic scope swivel member 733 to match the position of the red dot and the image in the center of the camera's viewfinder.

It is essential for the method of the invention to keep both eyes open. Let's assume the photographer sets the red or holographic dot to appear in the center of the viewfinder's image on the visual target 100 yards away. If the photographer is then looking for a visual target at a distance less than 100 yards, it will appear ever so slightly to the right of center of viewfinder. If further than 100 yards, it will appear to the left of center.

It recommended arranging the red or holographic dot to overlap the center of the viewfinder at infinity and to find a stationary visual target ½ to 1 mile away. When the camera 712 is set on a tripod, the IPD should be set and fine adjustments arranged. From this point on, whether looking for a star, a bird in sky or in the bush, if the red dot is placed on the visual target, it will appear in the photographer's magnified view, even if slightly of center.

It has been discussed above that according to embodiment of the invention illustrated in FIGS. 29-34 a zero magnification having the widest possible field of view, holographic or red dot scope 710, for a point of reference, is combined to the camera 712 in parallel to the lens system. There is only the need to adjust the distance from the zero magnification scope to the viewfinder to match the distance between the photographer's eyes. Since the eyes work in parallel, when the photographer keeps both eyes open, places the holographic mark or the red dot 710 on the visual target, it simultaneously appears magnified in the view finder/window 714/716 and the picture is taken.

Referring now to FIGS. 35-38 illustrating a modified embodiment of a pivot assembly adapted to accommodate a standard Long Rifle (LR) as it is mounted on a riflescope discussed above with respect to FIGS. 9-13. The modified embodiment of the assembly in many respects is similar to the previously discussed arrangement. Specifically, the universal base 360 is connected to the universal base clamp 366 by the respective fasteners. A combination of a camp pivot 351 and a clamp saddle 351a which define the receiving space 100L accommodating an exterior of the red dot scope. The universal base sub-assembly and the clamp pivot sub-assembly are pivotably movable with respect to each other.

Figure 38:
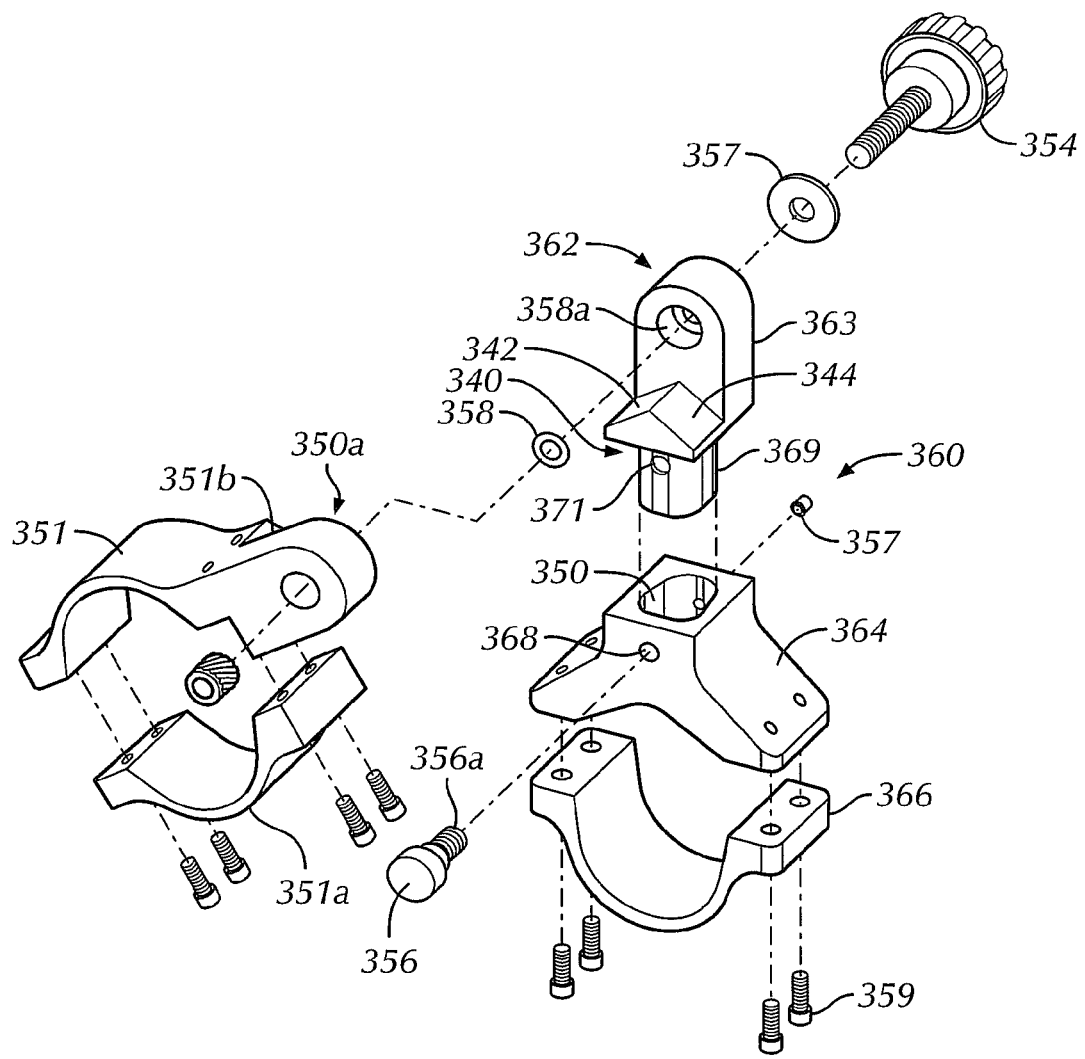
FIG. 38 is an exploded perspective view thereof.

As best illustrated in FIG. 38 in the modified embodiment, the universal base 360 is formed with an independent top portion 362, which is adapted for engagement with an independent bottom portion 364. The top portion is provided with a male part 369 which extends outwardly from an engaging upper part 363. The male part 369 is formed having a substantially cylindrical configuration. However, any conventional configuration of the male part is within the scope of the invention. The body of the male part and can be formed with an aperture 371 adapted for receiving an engaging section 356a of the locking fastener 356. An opening 350 is defined at the upper part of the bottom portion 464 and is adapted to movably receive the male part 369. A substantially horizontal aperture 368 can be formed within the bottom portion 364.

A shoulder region 340 is formed at the junction between the engaging upper part 363 and the male part 369 of the top portion 362 of the universal base. As illustrated in at least FIGS. 35, 36 and 38, the shoulder region 340 is defined by two substantially flat surfaces 340, 344 positioned at an angle to each other.

The shoulder region 340 with the angle shaped surfaces 342 and 344 allow for a simple pivoting motion of the clamp pivot unit without removing the assembly from the riflescope. Arrow C (see FIG. 36) illustrates the pivot action of the clamp pivot unit. The broken lines illustrate an alternate position of the clamp unit after completion of the pivotal motion in one direction.

The above-discussed split design of the universal base with the top 362 and bottom 364 portions, enables the sniper to initially and expeditiously adjust his set up. In this manner, when he or she approaches a target, alerting the target or prey to his presence can be avoided. By disengaging the male part 369 and the opening 350, the sniper can remove the holographic or red dot scope with the top part 362 of the universal base. When the sniper/hunter is in the shooting position, he/she places the top part 362 into the bottom part 364. To provide this connection, the male part 369 is inserted into the corresponding the opening 350. Then, the fastener 356 is tightened, to fit into the indentation 358 on the male part 369. A supplemental indentation is formed on the back of the male part 369 that corresponds to the position of the ball spring insert 357. When the male part 369 is completely inserted into the opening 350 and the fastener 356 is fully tightened, the assembly is positively positioned, so the sniper can proceed without the necessity to adjust the original settings.

What is claimed is:

1. A power scope and a visual target acquisition scope system in combination, comprising:
   a power scope viewed with a first eye of the user;
   a visual target acquisition scope system for adjustable connection between a unity magnification scope producing 1× magnification image viewed with a second eye of the user, the system comprising:
   a lower swivel assembly adjustably connected to the power scope and an upper swivel assembly adjustably receiving the unity magnification scope, at least one swivel member disposed substantially parallel to the optical axis of the power scope and movably/rotationally connecting the lower swivel assembly to the upper swivel assembly, the upper swivel assembly adjustably receiving the unity magnification scope;
   wherein the upper swivel assembly and the unity magnification scope are rotatable about said at least one swivel member and about the axis which is substantially parallel to the optical axis of power scope.

2. The combination of claim 1, wherein an optical axis of the unity power scope is constantly maintained to be parallel to the optical axis of the power scope.

3. The combination of claim 2, wherein the visual target acquisition scope system including the unity magnification scope can be further adjusted by means of rotation of the upper swivel assembly through rotation of a swivel arm about a bottom swivel member.

4. The combination of claim 1, wherein in use of said unity magnification scope and said power scope a user simultaneously finds a view of a target and maintains the target at an enlarged field of view, so that while the user is looking at the object through said unity magnification scope with the second eye and looking at the object through the power scope with the first eye, the target visible to the second eye is simultaneously visible to the first eye, so as to provide acquisition and viewing of the object through the power scope by the first eye.

5. The combination of claim 1, wherein said unity magnification scope is a red dot scope providing a red dot point of reference at the optical axis thereof, so that when the object is viewed simultaneously by said first and second eyes, while the red dot is placed on the object, said object simultaneously is visible within said power scope by the first eye and remains visible by the first eye as long as it remains visible to the second eye through said red dot scope.

* * * * *